United States Patent
Chida

(10) Patent No.: US 9,830,675 B2
(45) Date of Patent: Nov. 28, 2017

(54) IMAGE-PROCESSING APPARATUS

(71) Applicant: OLYMPUS CORPORATION, Tokyo (JP)

(72) Inventor: Kazue Chida, Tokyo (JP)

(73) Assignee: OLYMPUS CORPORATION, Tokyo (JP)

(*) Notice: Subject to any disclaimer, the term of this patent is extended or adjusted under 35 U.S.C. 154(b) by 16 days.

(21) Appl. No.: 15/000,589

(22) Filed: Jan. 19, 2016

(65) Prior Publication Data
US 2016/0210715 A1 Jul. 21, 2016

(30) Foreign Application Priority Data
Jan. 20, 2015 (JP) .................................. 2015-008481

(51) Int. Cl.
*G06T 1/60* (2006.01)
*G06T 1/00* (2006.01)

(52) U.S. Cl.
CPC .............. *G06T 1/0007* (2013.01); *G06T 1/60* (2013.01)

(58) Field of Classification Search
None
See application file for complete search history.

(56) References Cited

U.S. PATENT DOCUMENTS

| | | | | |
|---|---|---|---|---|
| 5,016,162 A * | 5/1991 | Epstein | ................. | G06F 13/374 710/242 |
| 6,307,588 B1 * | 10/2001 | Olson | ...................... | G06T 1/60 345/505 |
| 6,665,749 B1 * | 12/2003 | Ansari | ................ | G06F 13/1678 710/29 |
| 6,920,539 B2 * | 7/2005 | Qawami | ............... | G06F 13/161 711/105 |
| 8,482,573 B2 * | 7/2013 | Mallett | ..................... | G06T 1/60 345/531 |
| 9,430,992 B2 * | 8/2016 | Yamada | .................... | G06T 1/60 |
| 2003/0161015 A1 * | 8/2003 | Hiji | .................... | H04N 1/32358 358/538 |
| 2006/0050992 A1 | 3/2006 | Aoki et al. | | |

FOREIGN PATENT DOCUMENTS

JP 2004-127093 A 4/2004

* cited by examiner

*Primary Examiner* — Michelle M Hausmann
(74) *Attorney, Agent, or Firm* — Westerman, Hattori, Daniels & Adrian, LLP

(57) ABSTRACT

An image-processing apparatus includes a memory in which first image data is recorded, wherein the first image data includes second image data an offset-calculating block configured to calculate an offset when transfer data is read for each row, wherein an amount of position gap between a storage area of data of a first row of the first image data and a storage area of data of a second row includes the offset and wherein the access boundary is a boundary of data capable of being accessed through one access to the memory, a write block configured to write the first image data, a write control block configured to control the write block, a read block configured to read the second image data, a read control block configured to control the read block, and an image-processing block configured to perform image processing on the second image data.

3 Claims, 18 Drawing Sheets

| ADDRESS | 0TH BIT | | | | 32ND BIT |
|---|---|---|---|---|---|
| 0 | 1ST PIXEL | 2ND PIXEL | 3RD PIXEL | 4TH PIXEL | |
| 1 | 5TH PIXEL | 6TH PIXEL | 7TH PIXEL | 8TH PIXEL | |
| 2 | 9TH PIXEL | 10TH PIXEL | 11TH PIXEL | 12TH PIXEL | |

IMAGE-PROCESSING APPARATUS

BACKGROUND OF THE INVENTION

Field of the Invention

The present invention relates to an image-processing apparatus.

Priority is claimed on Japanese Patent Application No. 2015-008481, filed on Jan. 20, 2015, the content of which is incorporated herein by reference.

Description of Related Art

An image is divided into a plurality of regions each having any size, and positions corresponding to regions between a plurality of different images are determined based on motion vector information to perform image processing. Thus, there is a method of segmenting partial image data of a rectangular region from image data to transfer the segmented partial image data when the image data is transferred from a memory storing the image data to an image-processing block. To speed up processing necessary for this transfer, a method of reducing the number of transferring actions is disclosed in the publication of Japanese Unexamined Patent Application, First Publication No. 2004-127093. In a method disclosed in the publication of Japanese Unexamined Patent Application, First Publication No. 2004-127093, a portion of data of continuous addresses from a $1^{st}$ address (an address of data of an upper-left corner of a rectangular region) of partial image data of the rectangular region to a last address (an address of data of a lower-right corner of the rectangular region) in a memory is read.

When data of one row of the rectangular region is transferred in the above-described method, data may be read from the memory over a boundary of data capable of being accessed through one access to the memory. Hereinafter, the boundary of the data capable of being accessed through the one access is referred to as an access boundary.

FIGS. 12 and 13 illustrate a state of image data stored in the memory. A small rectangle indicates a pixel. In FIGS. 12 and 13, an amount of data of one pixel is 8 bits. An amount of data capable of being accessed through the one access to the memory is 32 bits. That is, it is possible to access data of four pixels through one access to the memory and transfer the data. A boundary of a region of four pixels in a horizontal direction is an access boundary. The access boundary appears every four pixels in the horizontal direction. In FIG. 13, access boundaries B200, B201, B202, and B203 are illustrated.

In FIG. 13, partial image data IMG200 and image data IMG205 of rectangular regions are illustrated. Image data IMG200 and the image data IMG205 are constituted of data of six rows and data of each row is constituted of data of four pixels. The image data IMG200 is in contact with the access boundary B200. When data of one row of the image data IMG200 is transferred, data crossing the access boundary B200 is not read from the memory. That is, the data of each row of the image data IMG200 is read from the memory through one access to the memory. The data of each row of the image data IMG200 is transferred from the memory through one burst transfer.

The access boundary B202 is located inside the image data IMG205. That is, data of one row of the image data IMG205 is stored in the memory crossing access boundary B202. When data of one row of the image data IMG205 is transferred, data crossing the access boundary B202 is read from the memory. Thus, two accesses to the memory are necessary to transfer data of one row of the image data IMG205. Data of each row of the image data IMG205 is transferred from the memory through two burst transfers. Therefore, the number of transfers when the image data IMG205 is transferred is twice the number of transfers when the image data IMG200 is transferred.

SUMMARY OF THE INVENTION

According to a first aspect of the present invention, an image-processing apparatus includes: a memory in which first image data is recorded, wherein the first image data includes second image data of a rectangular region; an offset-calculating block configured to calculate an offset for reading transfer data from the memory without crossing an access boundary in at least one row when transfer data to be transferred through a burst transfer among the second image data is read from the memory for each row, wherein an amount of position gap between a storage area of data of a first row of the first image data and a storage area of data of a second row adjacent to the first row includes the offset in the memory and wherein the access boundary is a boundary of data capable of being accessed through one access to the memory; a write block configured to write the first image data to the memory through a bus; a write control block configured to generate a write address of the first image data based on the offset calculated by the offset-calculating block and control the write block based on the generated write address; a read block configured to read the second image data from the memory through the bus; a read control block configured to generate a read address a the second image data based on the offset calculated by the offset-calculating block and control the read block based on the generated read address; and an image-processing block configured to perform image processing on the second image data read by the read block.

According to a second aspect of the present invention, in the image-processing apparatus according to the above-described first aspect, the offset-calculating block may calculate the offset based on an amount of data capable of being accessed through one access to the memory, an amount of data of one pixel, and a horizontal size of the rectangular region.

According to a third aspect of the present invention, in the image-processing apparatus according to the above-described second aspect, the offset-calculating block may calculate the number of pixels per access by dividing the amount of data capable of being accessed through the one access to the memory by the amount of data of the one pixel, the offset-calculating block may calculate the minimum number of accesses necessary to transfer data of the horizontal size by dividing the horizontal size of the rectangular region by the number of pixels per access, the offset-calculating block may calculate a third value by adding 1 to a second value obtained by subtracting the horizontal size of the rectangular region from a first value obtained by multiplying the minimum number of accesses by the number of pixels per access, and calculate a fourth value by dividing the number of pixels per access by the third value, wherein the fourth value is the number of rows necessary to generate a row in which the transfer data does not cross a boundary of the address when the transfer data is read from the memory, and the offset-calculating block may calculate the offset of each row by dividing the number of pixels per access by the fourth value.

According to a fourth aspect of the present invention, in the image-processing apparatus according to the above-described first aspect the offset may be less than an amount of data capable of being transferred through one transfer.

According to as fifth aspect of the present invention, in the image-processing apparatus according to the above-described first aspect, the offset of each row may be a fixed value.

BRIEF DESCRIPTION OF THE DRAWINGS

FIG. 11 is a reference diagram illustrating positions of image data in a memory in an embodiment of the present invention.

FIG. 14 is a reference diagram illustrating positions of image data in a memory in the conventional technology.

FIG. 15 is a reference diagram illustrating positions of image data in a memory in the conventional technology.

FIG. 19 is a reference diagram illustrating positions of image data in a memory in the conventional technology.

DETAILED DESCRIPTION OF THE INVENTION

Figure 1:
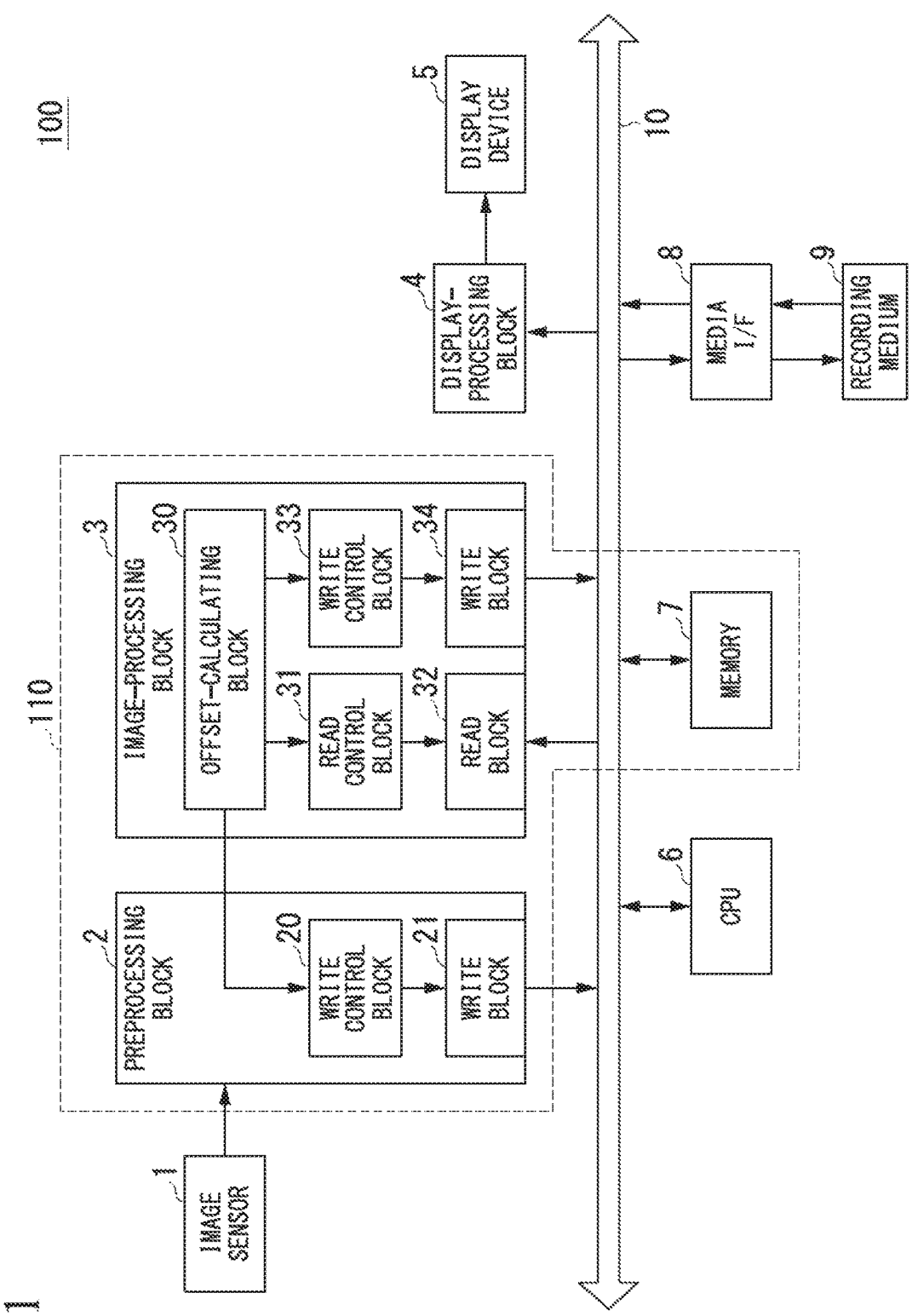
FIG. 1 is a block diagram illustrating a configuration of an imaging apparatus of an embodiment of the present invention.

Hereinafter, embodiments of the present invention will be described with reference to the drawings. FIG. 1 is a block diagram illustrating a configuration of an imaging apparatus 100 of the embodiment of the present invention. As illustrated in FIG. 1, the imaging apparatus 100 includes an image sensor 1, a preprocessing block 2, an image-processing block 3, a display-processing block 4, a display device 5, a central processing unit (CPU) 6, a memory 7, a media interface (I/F) 8, a recording medium 9, and a bus 10. The preprocessing block 2, the image-processing block 3, and the memory 7 constitute an image-processing unit 110. The preprocessing block 2 includes a write control block 20 and a write block 21. The image-processing block 3 includes an offset-calculating block 30, a read control block 31, a read block 32, a write control block 33, and a write block 34.

The image sensor 1 is a charge-coupled device (CCD) or a complementary metal oxide semiconductor (CMOS) image sensor or the like. The image sensor 1 generates image data.

The preprocessing block 2 performs preprocessing such as flaw correction or shading correction on image data output from the image sensor 1. The image data processed by the preprocessing block 2 is stored in the memory 7. The image-processing block 3 reads the image data from the memory 7 and performs image processing on the read image data. Thereby, the image-processing block 3 generates display image data or record image data. The generated display image data or the record image data is stored in the memory 7.

The display-processing block 4 acquires the display image data from the memory 7. The display-processing block 4 performs display processing such as on-screen display (OSD) superimposition processing on the display image data. The display image data processed by the display-processing block 4 is output to the display device 5. The display device 5 is a display device such as a thin film transistor (TFT) or an organic electroluminescence (EL) display. The display device 5 displays an image based on the display image data.

The CPU 6 performs overall control of the imaging apparatus 100. The memory 7 records image data or necessary data or information such as motion vector information. The image data is recorded to the memory 7. The image data (first image data) includes image data (second image data which is hereinafter referred to as partial image data) of a rectangular region. The partial image data is a part of the entire image data stored in the memory 7. That is, the number of pixels of the partial image data is less thin the total number of image data pixels. The partial image data includes data of at least two rows. When the image data is transferred from the memory 7, one burst transfer is performed through one access to the memory 7.

The media I/F 8 acquires record image data from the memory 7 and records the record image data to the recording medium 9. In addition, the media I/F 8 acquires the record image data from the recording medium 9 and transfers the record image data to the memory 7. The recording medium 9 records the necessary data or information. The bus 10 transmits data, a command, etc.

The preprocessing block 2 has a preprocessing circuit which performs preprocessing and includes the write control block 20 and the write block 21. Illustration of the preprocessing circuit is omitted in FIG. 1. The image-processing block 3 has an image-processing circuit and includes the offset-calculating block 30, the read control block 31, the read block 32, the write control block 33, and the write block 34. The illustration of the image-processing circuit is omitted in FIG. 1.

The offset-calculating block 30 calculates an offset for reading transfer data from the memory 7 without crossing an access boundary in at least one row when the transfer data to be transferred through a burst transfer among the partial image data (second image data) is read from the memory 7 for each row. In the memory 7, an amount of position gap between a storage area of data of a $1^{st}$ row of the image data and a storage area of data of a $2^{nd}$ row adjacent to the $1^{st}$ row includes the offset. The access boundary is a boundary of data capable of being accessed through one access to the memory 7.

The write block 21 writes the image data (first image data) to the memory 7 through the bus 10. The write control block 20 generates a write address of the image data (first image data) based on the offset calculated by the offset-calculating block 30 and controls the write block 21 based on the generated write address The read block 32 reads the partial image data (second image data) from the memory 7 through the bus 10. The read control block 31 generates a read address of the partial image data (second image data) based on the offset calculated by the offset-calculating block 30 and controls the read block 32 based on the generated read address.

The write block 34 writes the partial image data (second image data) to the memory 7 through the bus 10. The write control block 33 generates a write address of the partial image data (second image data) based on the offset calculated by the offset-calculating block 30 and controls the write block 34 based on the generated write address. A size of the partial image data (second image data) read from the memory 7 may not be the same as a size of the partial image data processed by the image-processing block 3 and written to the memory 7.

The image-processing block 3 performs image processing on the partial image data read by the read block 32. For example, the image-processing block 3 performs at least one of noise elimination, a YC conversion process, a resizing process, and a compression process. This image processing is performed by the image-processing circuit. The write block 34 writes the image data on which the image processing is performed to the memory 7.

(First Example of Offset)

Figure 15:
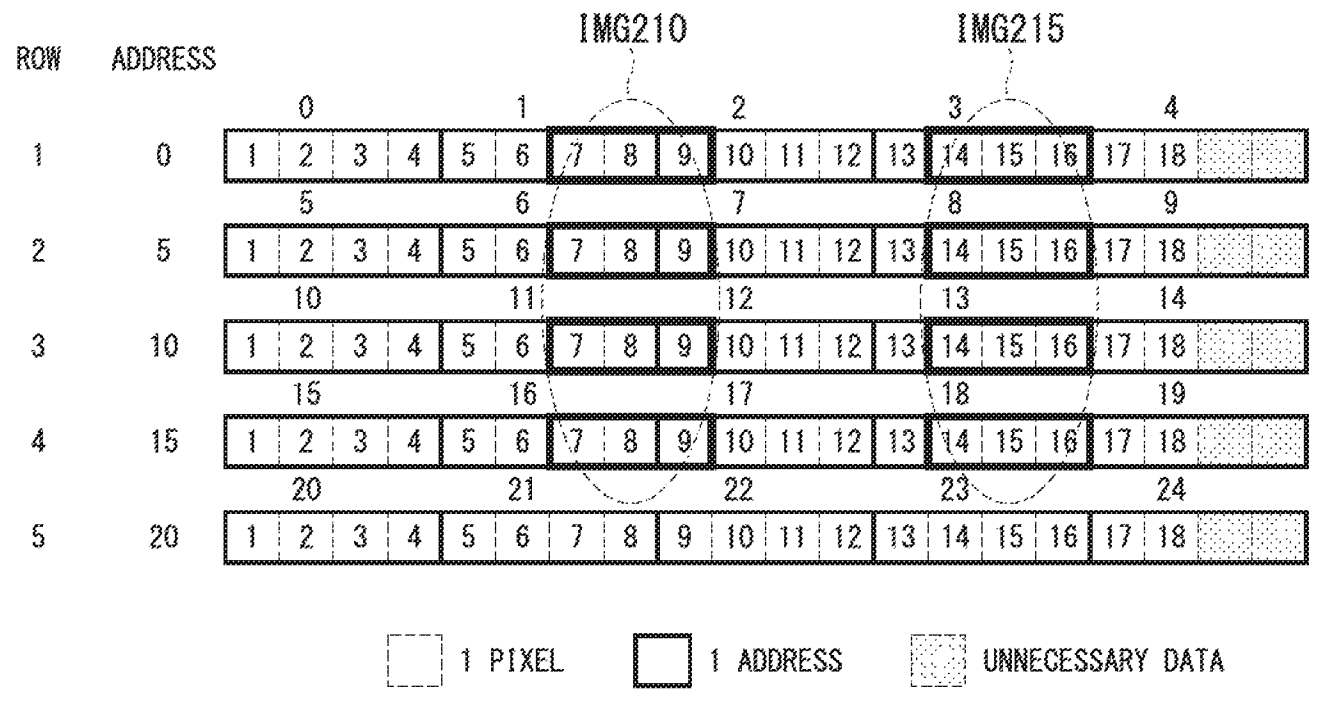

The first example of the offset will be described. FIGS. 14 and 15 illustrate positions of image data in a memory in a conventional technology.

In FIG. 14, a leftmost number denotes an address. As illustrated in FIG. 14, 32-bit data can be stored at one address of the memory. Data of one pixel is constituted of 8 bits. In the case of little-endian, which is one data storage scheme, data is stored in sequence from a lower-order bit of each address. At address 0, data of four pixels from a $1^{st}$ pixel to a $4^{th}$ pixel is stored. At address 1, data of four pixels from a $5^{th}$ pixel to an $8^{th}$ pixel is stored. At address 2, data of four pixels from a $9^{th}$ pixel to a $12^{th}$ pixel is stored.

FIG. 15 illustrates positions of data of pixels on a memory. In FIG. 15, positions of image data constituted of data of five rows are illustrated. A leftmost number denotes a row number. A number written to the right, of the row number denotes an address at which data of a $1^{st}$ pixel of each row is stored. Data of each row is constituted of data of 18 pixels. Numbers of 1 to 18 denote data of pixels of each row. Numbers of 0 to 24 written every four pixels denote addresses. In each row, data of pixels is adjacent on an address space of the memory. Data of $17^{th}$ and $18^{th}$ pixels of each row is stored at addresses 4, 9, 14, 19, and 24, respectively. At addresses 4, 9, 14, 19, and 24, the data of the $17^{th}$ and $18^{th}$ pixels is stored in lower-order bits. At addresses 4, 9, 14, 19, and 24, unnecessary data (invalid data) is stored in higher-order bits.

Data of a last pixel of each row and data of a $1^{st}$ pixel of a row following each row are stored at continuous addresses. For example, data of an $18^{th}$ pixel of a $1^{st}$ row is stored at address 4. Data of a $1^{st}$ pixel of a $2^{nd}$ row is stored at address 5. Addresses 4 and 5 are continuous.

A position at which data of a $1^{st}$ pixel of each row is stored is a position next to a position at which unnecessary data subsequent to data of a last pixel of a previous row is stored. When a position at which data of a last pixel of each row is stored is not a last position of the address, unnecessary data is stored so that the address is filled with data. When data of each row is constituted of data of 18 pixels, data of a last pixel of each row is stored at a $2^{nd}$ position of the address. Unnecessary data is stored at $3^{rd}$ and $4^{th}$ positions of the address.

Data of a last pixel of the $1^{st}$ row is stored at a $2^{nd}$ position of address 4. Unnecessary data is stored at $3^{rd}$ and $4^{th}$ positions of address 4. Data of a $1^{st}$ pixel of a $2^{nd}$ row is stored at a $1^{st}$ position of address 5. Data of a last pixel of the $2^{nd}$ row is stored at a $2^{nd}$ position of address 9. Unnecessary data is stored at $3^{rd}$ and $4^{th}$ positions of address 9. Data of a $1^{st}$ pixel of a $3^{rd}$ row is stored at a $1^{st}$ position of address 10.

Data of a last pixel of the $3^{rd}$ row is stored at a $2^{nd}$ position of address 14. Unnecessary data is stored in $3^{rd}$ and $4^{th}$ positions of address 14. Data of a $1^{st}$ pixel of a $4^{th}$ row is stored at a $1^{st}$ position of address 15. Data of a last pixel of the $4^{th}$ row is stored at a $2^{nd}$ position of address 19. Unnecessary data is stored at $3^{rd}$ and $4^{th}$ positions of address 19. Data of a $1^{st}$ pixel of a $5^{th}$ row is stored at a $1^{st}$ position of address 20. Data of a last pixel of the $5^{th}$ row is stored at a $2^{nd}$ position of address 24. Unnecessary data is stored at $3^{rd}$ and $4^{th}$ positions of address 24.

In FIGS. 14 and 15, an amount of data of one pixel is 8 bits. An amount of data capable of being accessed through the one access to the memory is 32 bits. That is, it is possible to access data of four pixels through one access to the memory and transfer the data. A boundary of a region of four pixels in the horizontal direction is an access boundary. The access boundary appears every four pixels in the horizontal direction. In FIG. 15, the access boundary matches an address boundary.

In FIG. 15, partial image data IMG210 and image data IMG215 are illustrated. Image data IMG210 and the image data IMG215 are constituted of data of four rows, and data of each row is constituted of data of three pixels. Data of each row of the image data IMG210 is constituted of data of $7^{th}$ to $9^{th}$ pixels in data of $1^{st}$ to $4^{th}$ rows of image data of 18 pixels×5 rows. Data of each row of the image data IMG 215 is constituted of data of $14^{th}$ to $16^{th}$ pixels in the data of the $1^{st}$ to $4^{th}$ rows of the image data of 18 pixels×5 rows.

Data of the $1^{st}$ row of the image data IMG210 is stored at addresses 1 and 2. Data of the $2^{nd}$ row of the image data IMG210 is stored at addresses 6 and 7. Data of the $3^{rd}$ row of the image data IMG210 is stored at addresses 11 and 12. Data of the $4^{th}$ row of the image data IMG210 is stored at addresses 16 and 17. That is, an access boundary is inside a region in which data of each row is stored with respect to all the rows of the image data IMG210. In FIG. 15, an access boundary is between a position at which data of the $8^{th}$ pixel of each row of the image data of 18 pixels×5 rows is stored and a position at which data of the $9^{th}$ pixel is stored. Thus, when the image data IMG210 is transferred from the memory, data of all rows of the image data IMG210 is read from the memory crossing access boundary.

On the other hand, no access boundary is inside a region in which data of each row is stored with respect to all rows of the image data IMG215. Thus, when the image data IMG215 is transferred from the memory, data of all rows of the image data IMG215 is read from the memory without crossing the access boundary.

In the conventional technology, the access boundary may be included according to a position of partial image data in the memory. In the conventional technology, an access boundary is in a region in which data of each row is stored with respect to all rows of the partial image data (for example, the image data IMG210). Alternatively, in the conventional technology, there are no access boundaries in a region in which data of each row is stored with respect to all rows of the partial image data (for example, the image data IMG215). When the image data IMG210 is transferred, a worst state in which the number of transfers of the partial image data is maximal occurs.

Figure 2:
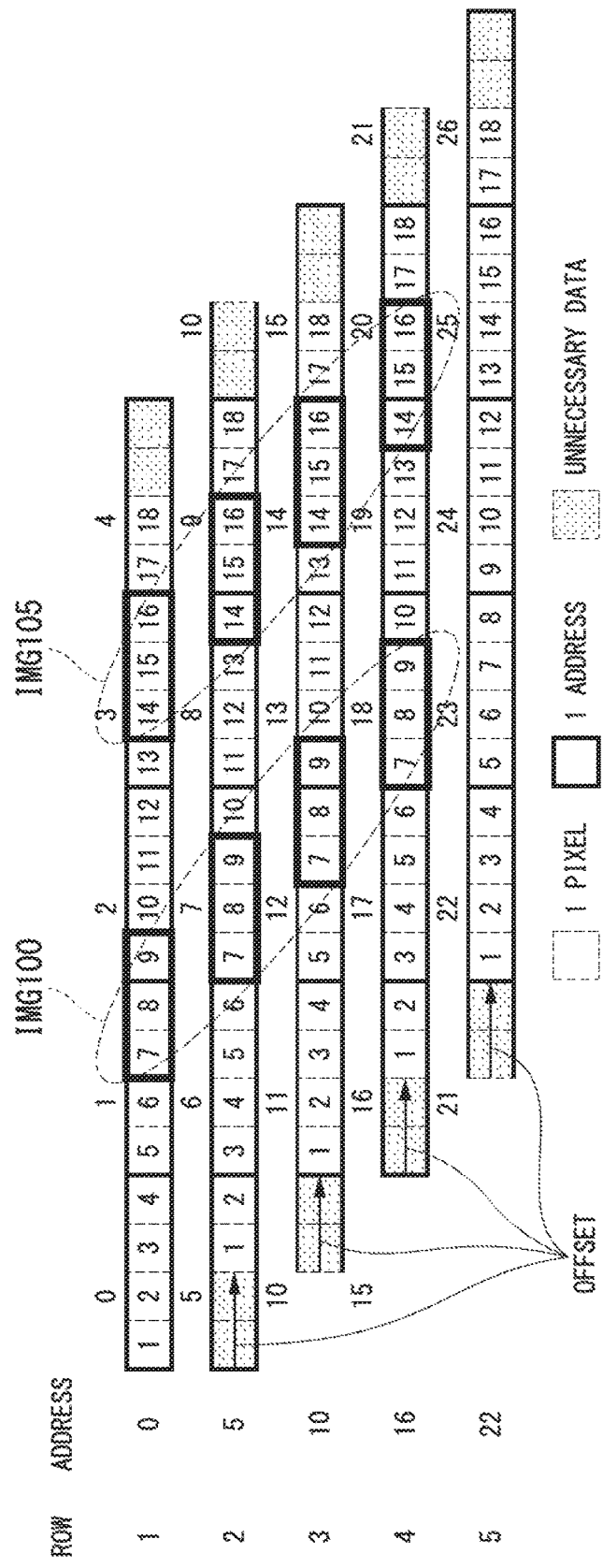
FIG. 2 is a reference diagram illustrating positions of image data in a memory in an embodiment of the present invention.

FIG. 2 illustrates positions of data of pixels on the memory 7 in the embodiment of the present invention. In FIG. 2, positions of image data constituted of data of five rows are illustrated. A leftmost number denotes a row number. A number written to the right of the row number denotes an address at which data of a $1^{st}$ pixel of each row is stored. Data of each row is constituted of data of 18 pixels. Numbers of 1 to 18 denote data of pixels of each row. Numbers of 0 to 26, which are written every four pixels, denote addresses. For each row, data of pixels is adjacent on an address space of the memory 7.

A position at which the data of the $1^{st}$ pixel of each row is stored is at the distance of an offset from a position next to a position at which unnecessary data that is subsequent to data of a last pixel of the previous row is stored. In FIG. 2, unnecessary data of two pixels is stored after data of a last pixel of each row. There is a region of the offset after a region in which the unnecessary data of the two pixels is stored. The offset of each row is indicated by an arrow. In FIG. 2, the offset of each row corresponds to two pixels. Unnecessary data is stored in the region of the offset.

Data of a last pixel of a $1^{st}$ row is stored at a $2^{nd}$ position of address 4. Unnecessary data is stored at $3^{rd}$ and $4^{th}$ positions of address 4. Data of a $1^{st}$ pixel of a $2^{nd}$ row is stored at a position at the distance two pixels from a $1^{st}$ position of address 5, that is, a $3^{rd}$ position of address 5. Data of a last pixel of the $2^{nd}$ row is stored at a last position of address 9. Unnecessary data is stored at $1^{st}$ and $2^{nd}$ positions of address 10.

Data of a $1^{st}$ pixel of a $3^{rd}$ row is stored at a position at the distance of two pixels from a $3^{rd}$ position of address 10, that is, a $1^{st}$ position of address 11. Data of a last pixel of the $3^{rd}$ row is stored at a $2^{nd}$ position of address 15. Unnecessary data is stored at $3^{rd}$ and $4^{th}$ positions of address 15. Data of a $1^{st}$ pixel of a $4^{th}$ row is stored at a position at the distance of two pixels from a $1^{st}$ position of address 16, that is, a $3^{rd}$ position of address 16. Data of a last pixel of the $4^{th}$ row is stored at a last position of address 20. Unnecessary data is stored at $1^{st}$ and $2^{nd}$ positions of address 21. Data of a $1^{st}$ pixel of a $5^{th}$ row is stored at a position at the distance of two pixels from a $3^{rd}$ position of address 21, that is, a $1^{st}$ position of address 22. Data of a last pixel of the $5^{th}$ row is stored at a $2^{nd}$ position of address 26. Unnecessary data is stored at $3^{rd}$ and $4^{th}$ positions of address 26.

The offset-calculating block 30 calculates the above-described offset. The offset is less than an amount of data (the number of pixels) capable of being accessed through one access to the memory 7, that is, an amount of data (the number of pixels) capable of being transferred through one transfer.

In FIG. 2, it is possible to access data of four pixels through one access to the memory 7 and transfer the data. A boundary of a region of four pixels in the horizontal direction is an access boundary. The access boundary appears every four pixels in the horizontal direction. In FIG. 2, the access boundary matches an address boundary.

In FIG. 2, partial image data IMG100 and image data IMG105 are illustrated. Image data IMG100 and the image data IMG105 are constituted of data of four rows, and data of each row is constituted of data of three pixels. Data of each row of the image data IMG100 is constituted of data of $7^{th}$ to $9^{th}$ pixels in data of $1^{st}$ to $4^{th}$ rows of image data of 18 pixels×5 rows. Data of each row of the image data IMG105 is constituted of data of $14^{th}$ to $16^{th}$ pixels in data of the $1^{st}$ to $4^{th}$ rows of the image data of 18 pixels×5 rows.

Data of the $1^{st}$ row of the image data IMG100 is stored at addresses 1 and 2. Data of the $2^{nd}$ row of the image data IMG100 is stored at address 7. Data of the $3^{rd}$ row of the image data IMG100 is stored at addresses 12 and 13. Data of the $4^{th}$ row of the image data IMG100 is stored at address 18. That is, an access boundary is inside a region in which data of each row is stored with respect to some rows of the image data IMG100. In FIG. 2, an access boundary is inside a region in which the data of the $1^{st}$ and $3^{rd}$ rows of the image data IMG100 is stored. Thus, when the image data IMG100 is transferred from the memory 7, data of some rows of the image data IMG100 is read from the memory 7 crossing the access boundary.

Data of the $1^{st}$ row of the image data IMG105 is stored at address 3. Data of the $2^{nd}$ row of the image data IMG105 is stored at addresses 8 and 9. Data of the $3^{rd}$ row of the image data IMG105 is stored at address 14. Data of the $4^{th}$ row of the image data IMG105 is stored at addresses 19 and 20. That is, an access boundary is inside a region in which data of each row is stored with respect to some rows of the image data IMG105. In FIG. 2, an access boundary is inside a region in which the data of the $2^{nd}$ and $4^{th}$ rows of the image data IMG105 is stored. Thus, when the image data IMG105 is transferred from the memory 7, data of some rows of the image data IMG105 is read from the memory 7 crossing the access boundary.

When the image data IMG210 illustrated in FIG. 15 is transferred from the memory, two data transfers occur every row. Accordingly, eight data transfers occur for the entire image data IMG210. On the other hand, when the image data IMG100 illustrated in FIG. 2 is transferred from the memory 7, two data transfers occur in the $1^{st}$ and $3^{rd}$ rows and one data transfer occurs in the $2^{nd}$ and $4^{th}$ rows. Accordingly, six data transfers occur for the entire image data IMG100. The number of transfers when the image data IMG100 is transferred is less than the number of transfers when the image data IMG210 is transferred. That is, in FIG. 2, a worst state in which the number of transfers of the partial image data is maximal is avoided.

When the image data IMG215 illustrated in FIG. 15 is transferred from the memory, one data transfer occurs every row. Accordingly, four data transfers occur for the entire image data IMG215. On the other hand, when the image data IMG105 illustrated in FIG. 2 is transferred from the memory 7, one data transfer occurs in the $1^{st}$ and $3^{rd}$ rows and two data transfers occur in the $2^{nd}$ and $4^{th}$ rows. Accordingly, six data transfers occur for the entire image data IMG105. The number of transfers when the image data IMG105 is transferred is greater than the number of transfers when the image data IMG215 is transferred. As described above, the number of transfers of the partial image data may be greater than the number of transfers in the conventional technology. However, regardless of a position of a rectangular region, the number of transfers of the partial image data is less than the number of transfers in the worst state.

A row in which there is an offset need not be all rows from which data of a $1^{st}$ row of partial image data is excluded. The offset may be in only some rows from which the data of the $1^{st}$ row of the partial image data is excluded. The offset need not be the same in all rows. When an offset of each row is a fixed value, it is possible to easily calculate the offset. Although it is shown that the offset is less than an amount of data capable of being transferred through one transfer here, the offset may be greater than the amount of data capable of being transferred through the one transfer.

(Second Example of Offset)

The second example of the offset will be described. The offset of each row is a fixed value and corresponds to one pixel.

Figure 16:
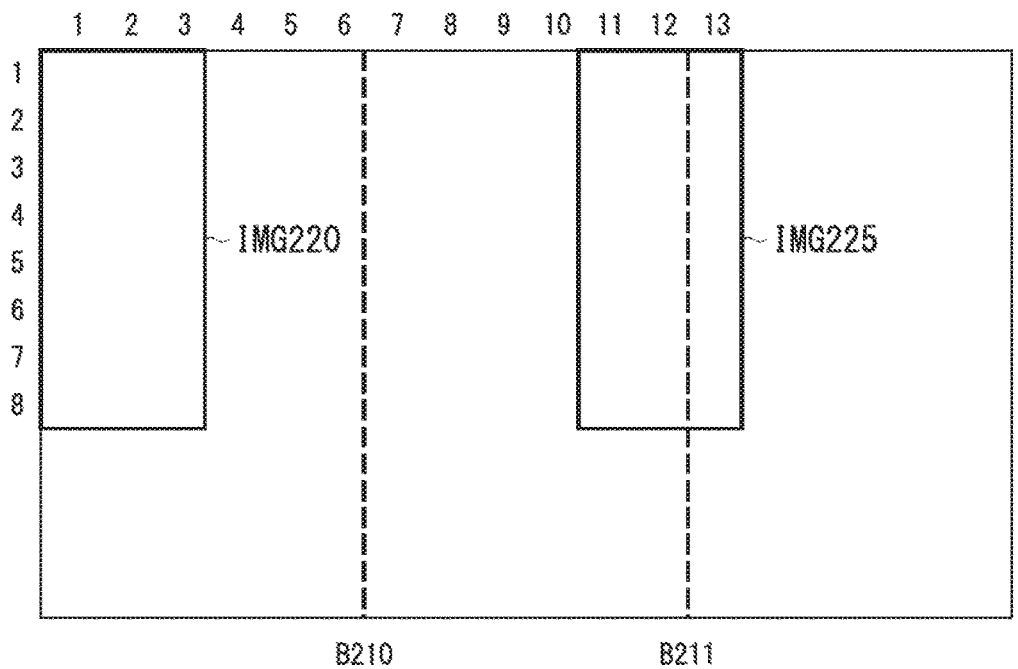
FIG. 16 is a reference diagram illustrating positions of image data in a memory in the conventional technology.

FIG. 16 illustrates positions of image data in a memory in the conventional technology. A leftmost number denotes a row number. An uppermost number denotes the number of pixels. A boundary of a region of six pixels in the horizontal direction is an access boundary. The access boundary appears every six pixels in the horizontal direction. In FIG. 16, the access boundary matches an address boundary. In FIG. 16, an access boundary B210 and an access boundary B211 are illustrated.

In FIG. 16, partial image data IMG220 and image data IMG225 are illustrated. Image data IMG220 and the image data IMG225 are constituted of data of eight rows, and data of each row is constituted of data of three pixels.

No access boundary is inside a region in which data of each row is stored with respect to all rows of the image data IMG220. Thus, when the image data IMG220 is transferred from the memory, data of all the rows of the image data IMG220 is read from the memory without crossing the access boundary.

On the other hand, the access boundary B211 is inside a region in which data of each row is stored with respect to all rows of the image data IMG225. Thus, when the image data IMG225 is transferred from the memory data of all the rows of the image data IMG225 is read from the memory crossing the access boundary.

Figure 3:
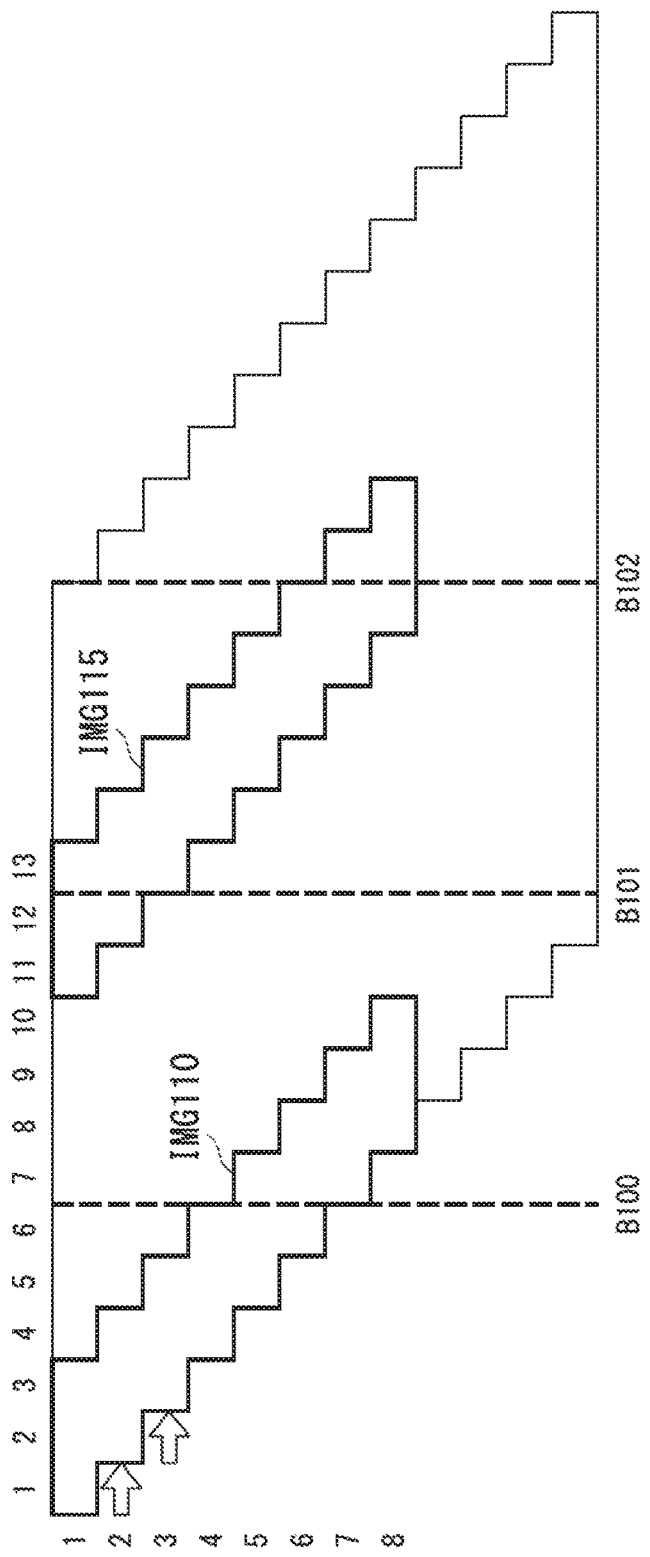
FIG. 3 is a reference diagram illustrating positions of image data in a memory in an embodiment of the present invention.

FIG. 3 illustrates positions of image data on the memory 7 in the embodiment of the present invention. A leftmost number denotes a row number. An uppermost number denotes the number of pixels. A boundary of a region of six pixels in the horizontal direction is an access boundary. The access boundary appears every six pixels in the horizontal direction. In FIG. 3, the access boundary matches an address boundary. In FIG. 3, an access boundary B100 an access boundary B101, and an access boundary B102 are illustrated. In FIG. 3, an offset of each row corresponds to one pixel.

In FIG. 3, partial image data IMG110 and image data IMG115 are illustrated. Image data IMG110 and the image data IMG115 are constituted of data of eight rows, and data of each row is constituted of data of three pixels.

An access boundary is inside a region in which data of each row is stored with respect to some rows of the image data IMG110. In FIG. 3, an access boundary is inside a region in which data of $5^{th}$ and $6^{th}$ rows of the image data IMG110 is stored. Thus, when the image data IMG110 is transferred from the memory 7, data of some rows of the image data IMG110 is read from the memory 7 crossing the access boundary.

An access boundary is inside a region in which data of each row is stored with respect to some rows of the image data IMG115. In FIG. 3, an access boundary is inside a region in which data of $1^{st}$, $2^{nd}$, $7^{th}$, and $8^{th}$ rows of the image data IMG115 is stored. Thus, when the image data IMG115 is transferred from the memory 7, data of some rows of the image data IMG115 is read from the memory 7 crossing the access boundary.

When the image data IMG225 illustrated in FIG. 16 is transferred from the memory, two data transfers occur every row. Accordingly, 16 data transfers occur for the entire image data IMG225. On the other hand, when the image data IMG115 illustrated in FIG. 3 is transferred from the memory 7, two data transfers occur in $1^{st}$, $2^{nd}$, $7^{th}$, and $8^{th}$ rows and one data transfer occurs in the other rows. Accordingly, 12 data transfers occur for the entire image data IMG115. The number of transfers when the image data IMG115 is transferred is less than the number of transfers when the image data IMG225 is transferred. That is, in FIG. 3, a worst state in which the number of transfers of the partial image data is maximal is avoided.

When the image data IMG220 illustrated in FIG. 16 is transferred from the memory, one data transfer occurs every row. Accordingly, eight data transfers occur for the entire image data IMG220. On the other hand, when the image data IMG110 illustrated in FIG. 3 is transferred from the memory 7, two data transfers occur in $5^{th}$ and $6^{th}$ rows and one data transfer occurs in the other rows. Accordingly, 10 data transfers occur for the entire image data IMG110. The number of transfers when the image data IMG110 is transferred is greater than the number of transfers when the image data IMG220 is transferred. However, the number of transfers of the image data IMG110 is less than the number of transfers in a worst state.

It is desirable that a size of a rectangular region in the vertical direction be less than an amount of data capable of being accessed through one access to the memory 7, that is, an amount of data capable of being transferred through one transfer. In FIG. 3, the number of rows of the rectangular region is 8 and an amount of data, capable of being transferred through one transfer is 3. In this case, no access boundary is inside a region in which data of at least one row of eight rows constituting the partial image data is stored.

(Third Example of Offset)

The third example of the offset will be described. The offset-calculating block 30 calculates an offset based on an amount of data capable of being accessed through one access to the memory 7 and an amount of data of one pixel. The offset of each row is a fixed value.

Figure 17:
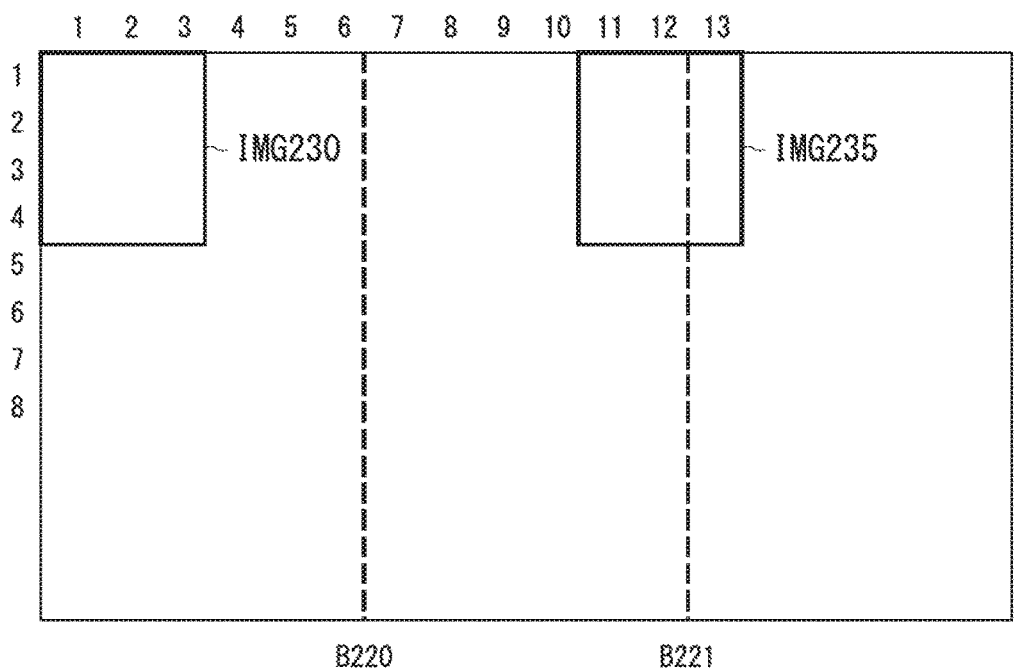
FIG. 17 is a reference diagram illustrating positions of image data in a memory in the conventional technology.

FIG. 17 illustrates positions of image data in a memory in the conventional technology. A leftmost number denotes a row number. An uppermost number denotes the number of pixels. A boundary of a region of six pixels in the horizontal direction is an access boundary. The access boundary appears every six pixels in the horizontal direction. In FIG. 17, the access boundary matches an address boundary. In FIG. 17, access boundaries B220 and B221 are illustrated.

In FIG. 17, partial image data IMG230 and image data IMG235 are illustrated. Image data IMG230 and the image data IMG235 are constituted of data of four rows, and data of each row is constituted of data of three pixels.

No access boundary is inside a region in which data of each row is stored with respect to all rows of the image data IMG230. Thus, when the image data IMG230 is transferred from the memory, data of all rows of the image data IMG230 is read from the memory without crossing the access boundary.

On the other hand, the access boundary B221 is inside a region in which data of each row is stored with respect to all rows of the image data IMG235. Thus, when the image data IMG235 is transferred from the memory data of all the rows of the image data IMG235 is read from the memory crossing the access boundary.

Figure 4:
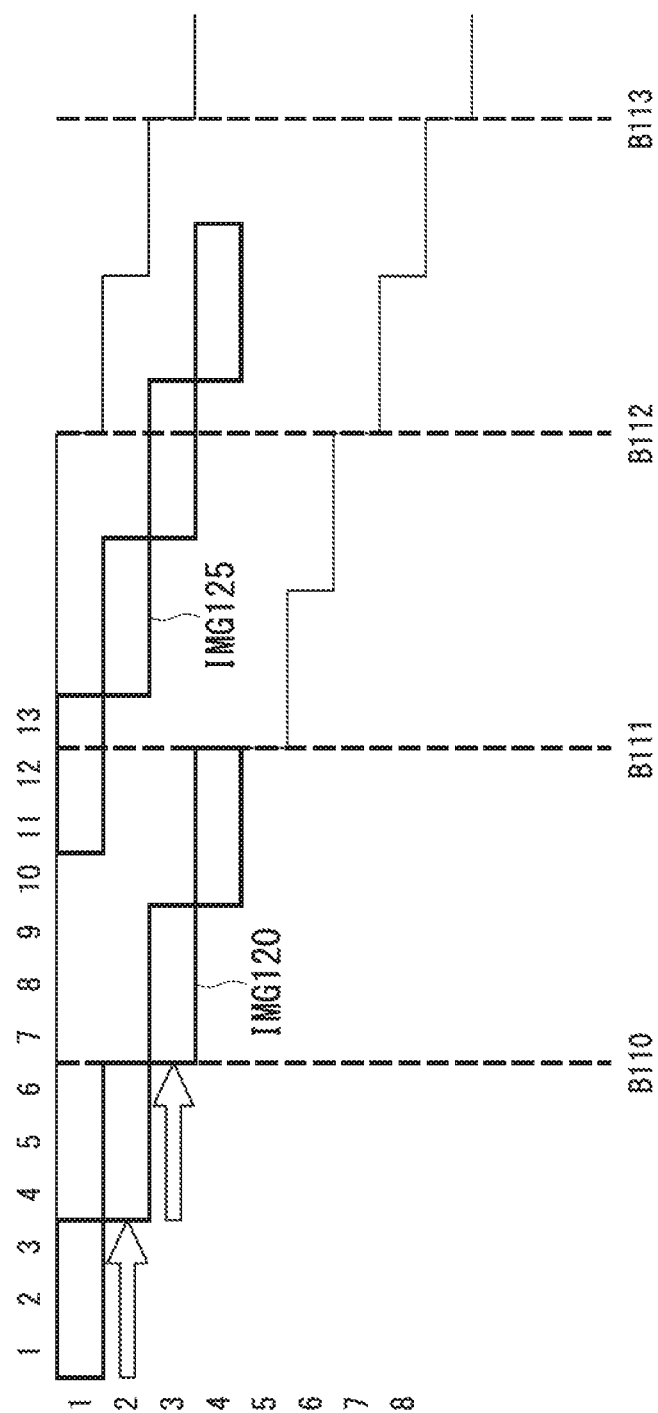
FIG. 4 is a reference diagram illustrating positions of image data in a memory in an embodiment of the present invention.

FIG. 4 illustrates positions of image data on the memory 7 in the embodiment of the present invention. A leftmost number denotes a row number. An uppermost number denotes the number of pixels. A boundary of a region of six pixels in the horizontal direction is an access boundary. The access boundary appears every six pixels in the horizontal direction. In FIG. 4, the access boundary matches an address boundary. In FIG. 4, an access boundary B110, an access boundary B111, an access boundary B112, and an access boundary B113 are illustrated. In FIG. 4, an offset of each row corresponds to three pixels.

In FIG. 4, partial image data IMG120 and image data IMG125 are illustrated. Image data IMG120 and the image data IMG125 are constituted of data of four rows, and data of each row is constituted of data of three pixels.

No access boundary is inside a region in which data of each row is stored with respect to all rows of the image data IMG120. Thus, when the image data IMG120 is transferred from the memory 7, data of all the rows of the image data IMG120 is read from the memory 7 without crossing the access boundary.

An access boundary is inside a region in which data of each row is stored with respect to some rows of the image data IMG125. In FIG. 4, an access boundary is inside a region in which the data of the $1^{st}$ and $3^{rd}$ rows of the image data IMG125 is stored. Thus, when the image data IMG125 is transferred from the memory 7, data of some rows of the image data IMG125 is read from the memory 7 crossing the access boundary.

When the image data IMG235 illustrated in FIG. 17 is transferred from the memory, two data transfers occur every row. Accordingly, eight data transfers occur for the entire image data IMG235. On the other hand, when the image data IMG125 illustrated in FIG. 4 is transferred from the memory 7, two data transfers occur in the $1^{st}$ and $3^{rd}$ rows and one data transfer occurs in the other rows. Accordingly, six data transfers occur for the entire image data IMG125. The number of transfers when the image data IMG125 is transferred is less than the number of transfers when the image data IMG235 is transferred. That is, in FIG. 4, a worst state in which the number of transfers of the partial image data is maximal is avoided.

When the image data IMG230 illustrated in FIG. 17 is transferred from the memory, one data transfer occurs every row. Accordingly, four data transfers occur for the entire image data IMG230. On the other hand, when the image data IMG120 illustrated in FIG. 4 is transferred from the memory 7, one data transfer occurs every row. Accordingly, four data transfers occur for the entire image data IMG120. The number of transfers when the image data IMG120 is transferred is the same as the number of transfers when the image data IMG230 is transferred.

For example, the offset-calculating block 30 calculates an offset by dividing half of an amount of data capable of being accessed through one access to the memory 7, that is, an amount of data capable of being transferred through one transfer, by an amount of data of one pixel. In FIG. 4, an amount, of data capable of being transferred through one transfer is an amount of data of six pixels. Thus, the offset corresponds to three pixels.

It is desirable that a size of a rectangular region the horizontal direction be less than or equal to half of an amount of data capable of being accessed through one access to the memory 7, that is, an amount of data capable of being transferred through one transfer. Thereby, when an access boundary is inside a region in which data of a certain row of the rectangular region is stored, no access boundary is inside a region in which data of a row following the certain row is stored. That is, no access boundary is inside a region in which data of at least one row of adjacent rows is stored in the rectangular region.

(Fourth Example of Offset)

The fourth example of the offset will be described. The offset-calculating block 30 calculates an offset based on an amount of data capable of being accessed through one access to the memory 7, an amount of data of one pixel, and a horizontal size of the rectangular region.

Figure 5:
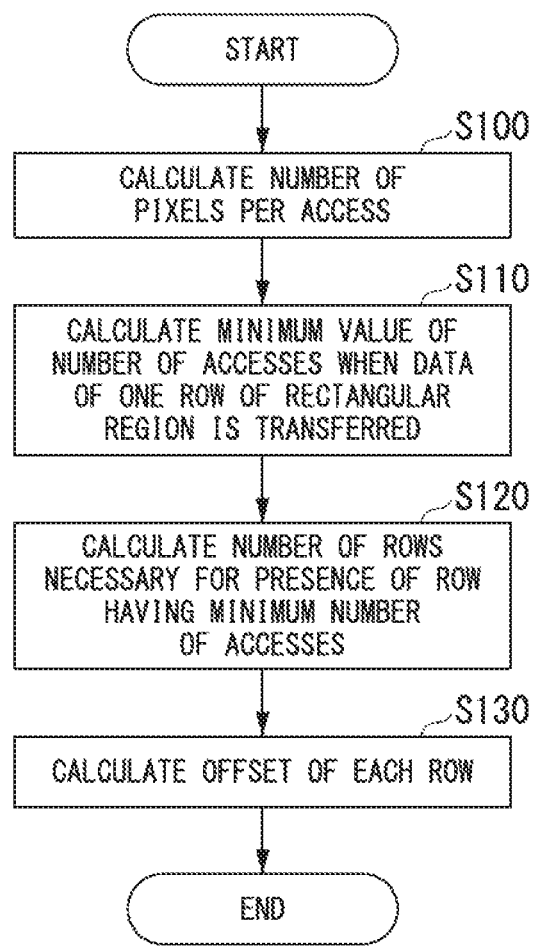
FIG. 5 is a flowchart illustrating a procedure of an operation of an offset-calculating block of an embodiment of the present invention.

FIG. 5 illustrates a procedure of an operation of the offset-calculating block 30. Hereinafter, the operation of the offset-calculating block 30 will be described.

The following information is output from the CPU 6 to the offset-calculating block 30.

Data amount of one access: A_data [bits]
Data amount of one pixel: P_data [bits]
Horizontal size (number of pixels of one row) of rectangular region: H_pix [pixels]
Vertical size (number of rows) of rectangular region: V_pix [rows]

The data amount of the one access is an amount of data to be accessed through one access to the memory 7. The offset-calculating block 30 calculates the offset according to the procedure illustrated in FIG. 5 based on the above-described information.

The offset-calculating block 30 calculates the number of pixels corresponding to the data amount of the one access (the number of pixels per access) (step S100). In step S100, the offset-calculating block 30 calculates the number of pixels A_pix per access according to Formula (1). A value after the decimal point of a calculation result of Formula (1) is rounded up.

$$A\_pix = A\_data / P\_data \qquad (1)$$

As shown in Formula (1), the offset-calculating block 30 calculates the number of pixels A_pix per access by dividing the data amount A_data of one access by the data amount P_data of one pixel.

Figure 6:
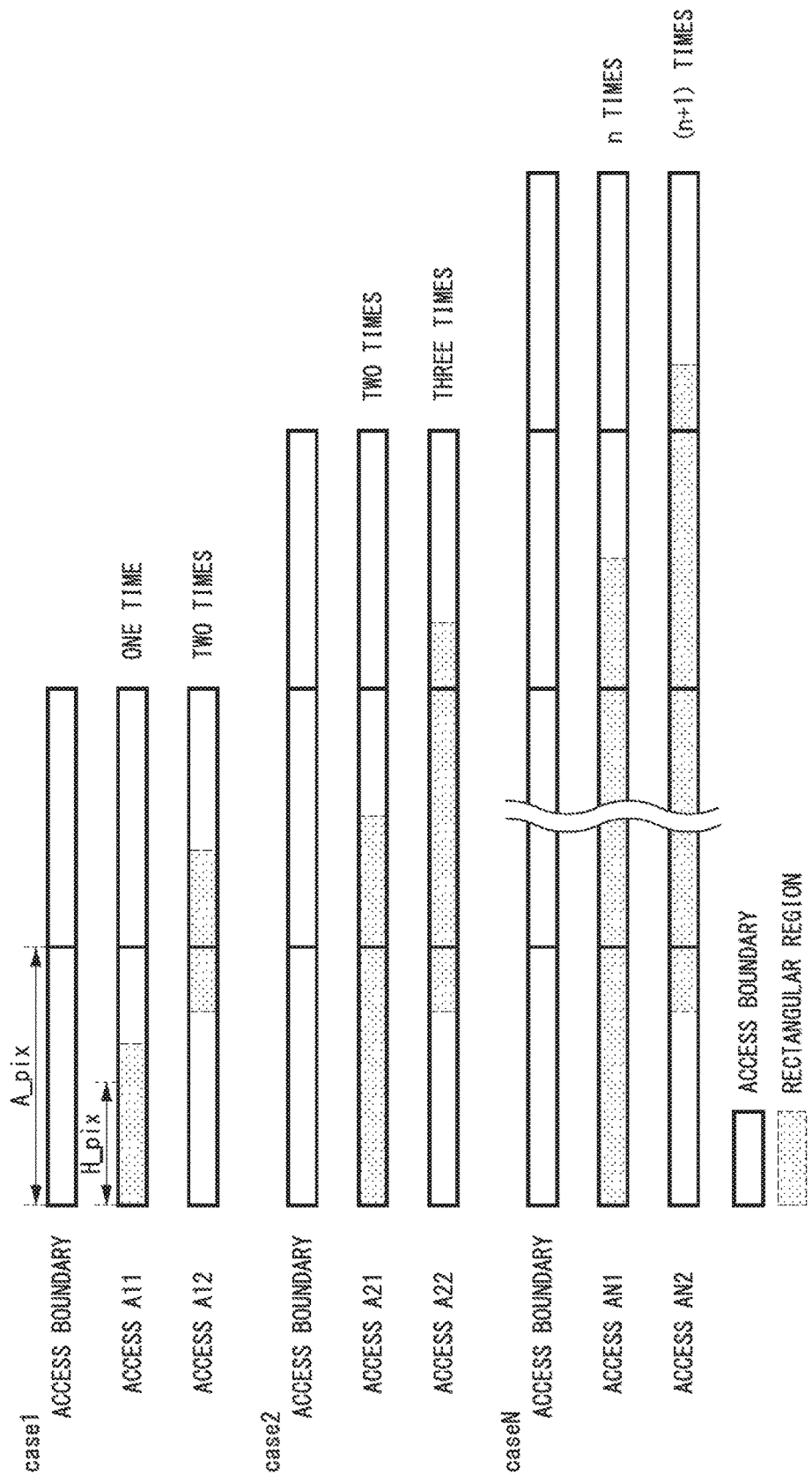
FIG. 6 is a reference diagram illustrating types of accesses to a memory of an embodiment of the present invention.

After step S100, the offset-calculating block 30 calculates a minimum value of the number of accesses when data of one row of the rectangular region is transferred (step S110). FIG. 6 illustrates types of accesses to the memory 7. In FIG. 6, an access boundary in the memory 7 and data of one row of the rectangular region to be accessed are illustrated. A width between two adjacent access boundaries is the same as the number of pixels A_pix per access.

In case 1, the horizontal size H_pix of the rectangular region is less than or equal to the number of pixels A_pix (H_pix≤A_pix) per access. In case 1, there are two types of accesses A11 and A12. In access A11, an access boundary is not included in a region to be accessed. That is, in access A11, transfer data is read from the memory 7 without crossing the access boundary. In access A11, the memory 7 is accessed once. In access A12, one access boundary is included in the region to be accessed. That is, in access A12, transfer data is read from the memory 7 while crossing the access boundary once. In access A12, the memory 7 is accessed twice.

In case 2, the horizontal size H_pix of the rectangular region is greater than the number of pixels A_pix per access, and the horizontal size H_pix of the rectangular region is less than or equal to twice the number of pixels A_pix per access (A_pix<H_pix≤2×A_pix). In case 2, there are two types of accesses A21 and A22. In access A21, an access boundary is included in a region to be accessed. That is, in access A21, transfer data is read from the memory 7 while crossing the access boundary once. In access A21, the memory 7 is accessed twice. In access A22, two access boundaries are included in the region to be accessed. That is, in access A22, transfer data is read from the memory 7 while crossing the access boundary twice. In access A22, the memory 7 is accessed thrice.

In case N, the horizontal size of the rectangular region is greater than (n−1) times the number of pixels A_pix per access, and the horizontal size H_pix of the rectangular region is less than or equal to n times the number of pixels A_pix per access ((n−1)×A_pix<H_pix≤n×A_pix). In case N, there are two types of accesses AN1 and AN2. In access AN1, (n−1) access boundaries are included in a region to be accessed. That is, in access AN1, transfer data is read from the memory 7 while crossing the access boundary (n−1) times. In access AN1, the memory 7 is accessed n times. In access AN2, n access boundaries are included in a region to be accessed. That is, in access AN2, transfer data is read from the memory 7 while crossing the access boundary n times.

In access AN2, the memory 7 is accessed (n+1) times.

Therefore, when (n−1) access boundaries are included in the region to be accessed (n is an integer greater than or equal to 1), a minimum value of the number of accesses when data of one row of the rectangular region is transferred is n. According to Formula (2), the offset-calculating block 30 calculates the minimum value n of the number of accesses. A value after the decimal point of a calculation result of Formula (2) is rounded up.

$$n = H\_pix / A\_pix \quad (2)$$

As shown in Formula (2), the offset-calculating block 30 calculates n by dividing the horizontal size H_pix of the rectangular region by the number of pixels A_pix per access. n is the minimum number of accesses necessary to transfer data of the horizontal size.

After step S110, the offset-calculating block 30 calculates the number of rows necessary for the presence of a row having minimum number of accesses (step S120). When there is a row having a minimum number of accesses in a region in which partial image data is stored, it is possible to avoid a worst state in which the number of transfers of the partial image data is maximal. The offset is given in one or more rows of a memory region of the number of rows calculated in step S120, so that the number of accesses may be minimized. When the offset is set so that a sum of all offsets of the memory region of the number of rows calculated in step S120 is equal to the number of pixels A_pix per access, the number of accesses is minimal in one or more rows.

Figure 7:
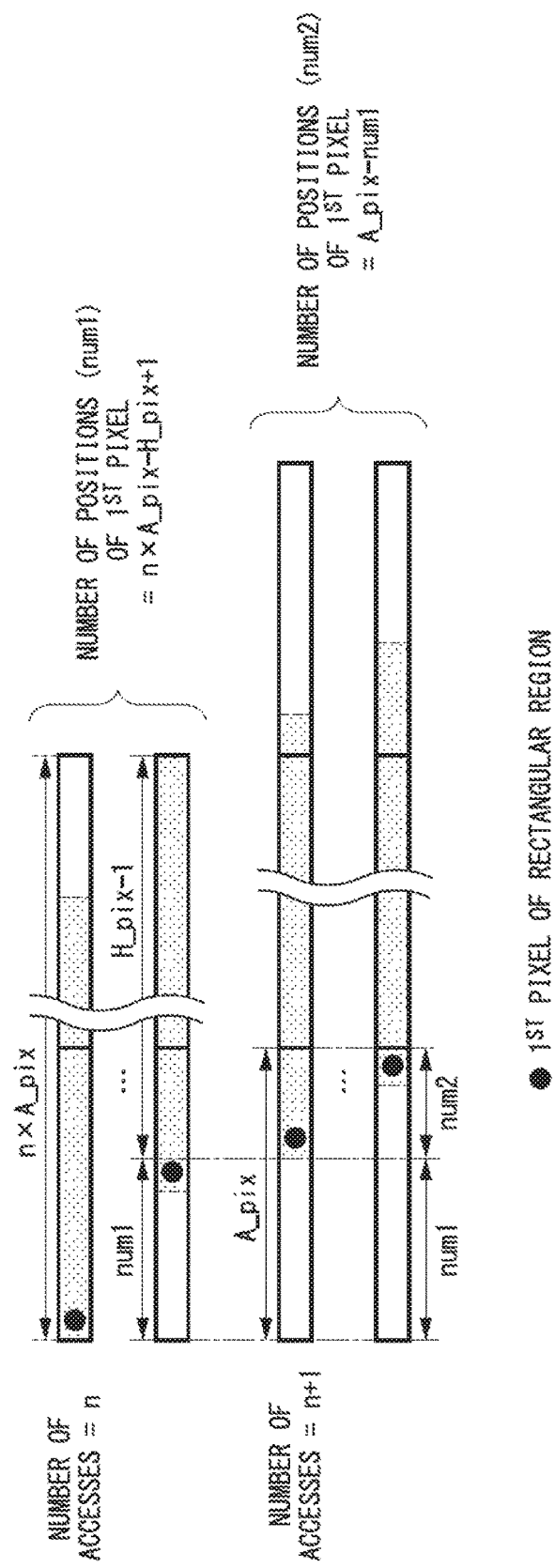
FIG. 7 is a reference diagram illustrating a relationship between a position of a $1^{st}$ pixel of a rectangular region and the number of accesses in a memory of an embodiment of the present invention.

FIG. 7 illustrates a relationship between a position of a $1^{st}$ pixel of a rectangular region in the memory 7 and the number of accesses. In FIG. 7, an access boundary in the memory 7 and data of one row of the rectangular region to be accessed are illustrated. In an upper portion in FIG. 7, an access boundary and data of one row of the rectangular region when the number of accesses is n are shown for each position of a $1^{st}$ pixel of the rectangular region. In a lower portion in FIG. 7, an access boundary and data of one row of the rectangular region when the number of accesses is (n+1) are shown for each position of a $1^{st}$ pixel of the rectangular region.

A width of a memory region between two adjacent access boundaries is A_pix. A_pix is the number of pixels. The number of positions at which data of a $1^{st}$ pixel of the rectangular region in the memory region of the width is stored is A_pix. In FIG. 7, the position at which the data of the $1^{st}$ pixel of the rectangular region is stored is indicated by a round mark. As described above, the number of accesses when data of one row of the rectangular region is transferred is n or (n+1).

When the number of accesses is n, a width of a memory region in which partial image data may be stored is n×A_pix. Because the horizontal size of the rectangular region is H_pix, the number of positions num1 at which data of a $1^{st}$ pixel of the rectangular region is stored in the memory region of the above-described width is calculated according to Formula (3).

$$\text{num1} = n \times A\_pix - H\_pix + 1 \quad (3)$$

When the number of accesses is n, the number of positions at which data of a $1^{st}$ pixel of the rectangular region may be stored is num1. Thus, when the number of accesses is (n+1), the number of positions num2 at which data of a $1^{st}$ pixel of the rectangular region in the memory region may be stored is calculated according to Formula (4).

$$\text{num2} = A\_pix - \text{num1} = A\_pix - (n \times A\_pix - H\_pix + 1) \quad (4)$$

As described above, the number of positions at which data of a $1^{st}$ pixel of the rectangular region may be stored in a memory region between two adjacent access boundaries is A_pix. Thus, a probability n1_rate at which the number of accesses is n is calculated according to Formula (5). In addition, a probability n2_rate at which the number of accesses is (n+1) is calculated according to Formula (6).

$$n1\_rate = \text{num1}/A\_pix = (n \times A\_pix - H\_pix + 1)/A\_pix \quad (5)$$

$$n2\_rate = \text{num2}/A\_pix = (A\_pix - (n \times A\_pix - H\_pix + 1))/A\_pix \quad (6)$$

The above-described probabilities n1_rate and n2_rate are probabilities related to data of one row of the rectangular region. When an event in which the number of accesses is n exclusively occurs every row, a probability of occurrence of an event in which the number of accesses is n in at least one of a plurality of rows of the rectangular region is a sum the probability n1_rate of each row. For example, a probability of occurrence of an event in which the number of accesses is n in at least one of two rows of the rectangular region is 2×n1_rate. A probability of occurrence of an event in which the number of accesses is n in at least one of three rows of the rectangular region is 3×n1_rate.

Formula (7) shows the condition in which a probability of occurrence of an event in which the number of accesses is n in at least one of x rows of the rectangular region is greater than or equal to 1.

$$1 \leq x \times n1\_rate \quad (7)$$

Formula (8) and Formula (9) are established from Formula (7).

$$x \geq 1/n1\_rate \quad (8)$$

$$x \geq A\_pix/(n \times A\_pix - H\_pix + 1) \quad (9)$$

Therefore, the offset-calculating block 30 calculates the number of rows x necessary for the presence of a row having the minimum number of accesses according to Formula (10). A value after the decimal point of a calculation result of Formula (10) is rounded up.

$$x = A\_pix/(n \times A\_pix - H\_pix + 1) \quad (10)$$

As shown in Formula (10), the offset-calculating block 30 calculates a third value by adding 1 to a second value obtained by subtracting the horizontal size H_pix of the rectangular region from a first value obtained by multiplying n which is the minimum number of accesses by the number of pixels A_pix per access. Further, the offset-calculating block 30 calculates a fourth value by dividing the number of pixels A_pix per access by the third value. The fourth value is the number of rows necessary for generating a row in which the transfer data does not cross the address boundary when the transfer data is read from the memory 7.

After step S120, the offset-calculating block 30 calculates an offset of each row (step S130). When the offset is set so that a sum of all offsets of the memory region of the number of rows calculated in step S120 is equal to the number of pixels A_pix per access, the number of accesses is minimal in one or two rows. The offset-calculating block 30 calculates an offset of each row according to Formula (11). A value after the decimal point of a calculation result of Formula (11) is rounded up.

$$\text{offset} = A\_pix/x \quad (11)$$

As show in Formula (11), the offset-calculating block 30 calculates the offset of each row by dividing the number of pixels A_pix per access by the fourth value (x).

Because there may be a fraction, the offset of the last row may not be the same as that of another row. The offset-calculating block 30 calculates an offset offset_fin of the last row according to Formula (12). The offset offset_fin of the last row may be the same as the offset of another row.

$$\text{offset\_fin} = A\_pix - (x-1) \times \text{offset} \quad (12)$$

Figure 8:
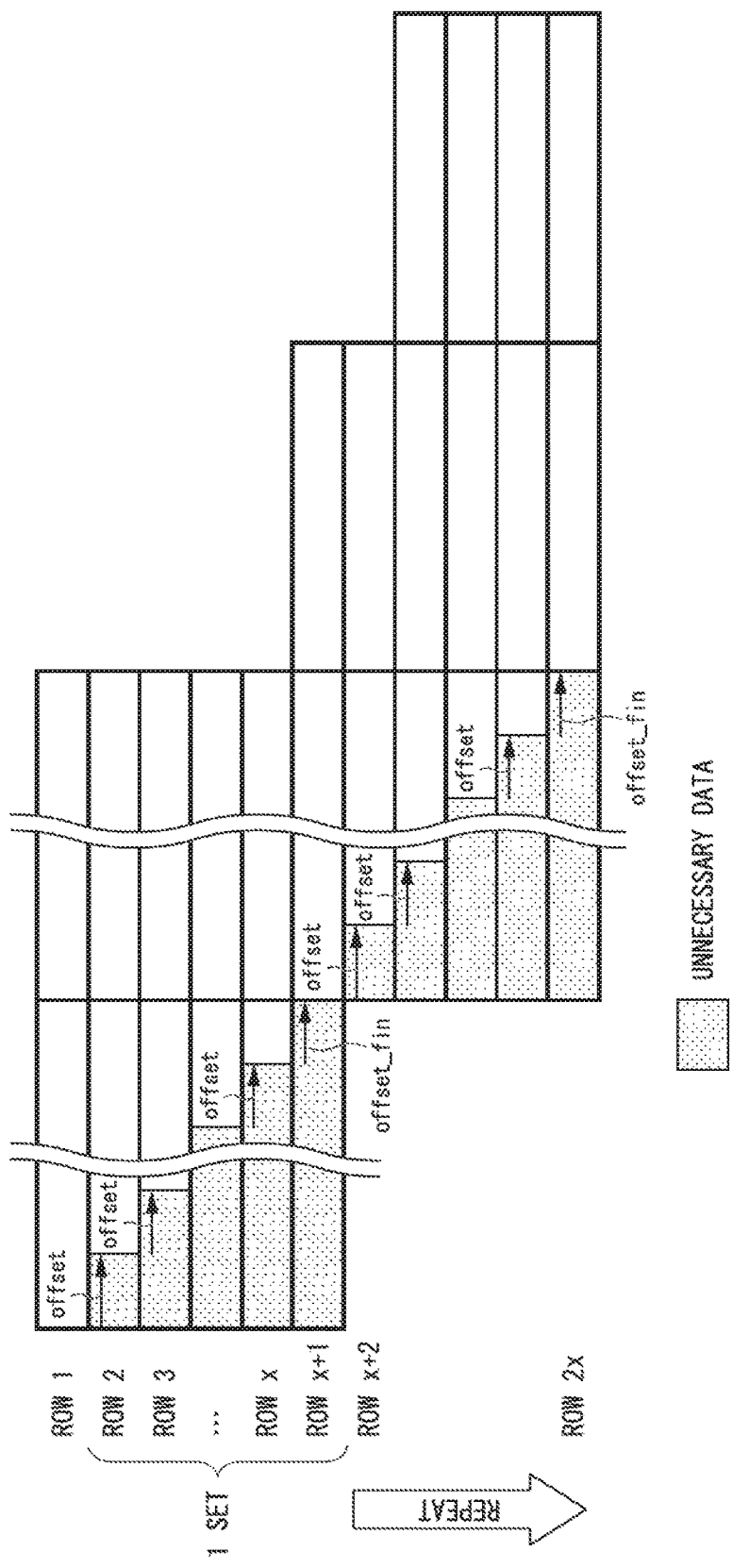
FIG. 8 is a reference diagram illustrating a given offset in an embodiment of the present invention.

FIG. 8 illustrates a given offset. In FIG. 8, a memory region of 2x rows is illustrated. A position at which $1^{st}$ data of a $2^{nd}$ row of image data is stored is shifted by an offset from a position based on a position at which $1^{st}$ data of a $1^{st}$ row of the image data is stored. Likewise, a position at which $1^{st}$ data of $3^{rd}$ to $x^{th}$ rows of the image data is stored is shifted by an offset from a position based on a position at which $1^{st}$ data of a previous row is stored. A position at which $1^{st}$ data of an $(x+1)^{th}$ row of the image data is stored is shifted by an offset offset_fin from a position based on a position at which $1^{st}$ data of the $x^{th}$ row of the image data is stored.

The number of accesses is minimal in at least one of $2^{nd}$ to $(x+1)^{th}$ rows of the image data. The same offset as the offset given in each of the $2^{nd}$ to $(x+1)^{th}$ rows of the image data is assigned to each of $(x+2)^{th}$ and subsequent rows.

According to Formulas (11) and (12), offsets of rows are substantially equivalent. In this case, only two registers of a register which holds the offset and a register which holds the offset offset_fin are necessary. When the offset differs according to each row, a register according to the number of different offsets is necessary. The offsets of the rows are substantially equivalent, and therefore it is possible to reduce the number of registers for holding the offset. That is, it is possible to reduce a circuit scale.

When a vertical size of the rectangular region is x or more rows, the number of accesses is minimal in at least one of the x rows. When the number of accesses of all rows of the rectangular region is (n+1), a worst state in which the number of transfers of partial image data is maximal occurs. The offset is given to each row as described above, so that the number of accesses is n in at least one of the x rows. Thus, the worst state in which the number of transfers of the partial image data is maximal is avoided.

A specific example of the offset will be described. For example, the following information is output from the CPU 6 to the offset-calculating block 30.

Data amount of one access: 512 [bits]
Data amount of one pixel: 8 [bits]
Horizontal size of rectangular region: 36 [pixels]
Vertical size of rectangular region: 36 [rows]

In step S100, the offset-calculating block 30 calculates the number of pixels A_pix per access according to Formula (13) corresponding to Formula (1).

$$A\_pix = A\_data/P\_data = 512/8 = 64 \text{ [pixels]} \quad (13)$$

In step S110, the offset-calculating block 30 calculates a minimum value n of the number of accesses according to Formula (14) corresponding to Formula (2).

$$n = H\_pix/A\_pix = 36/64 = 0.56 \quad (14)$$

A value after the decimal point is rounded up and therefore the minimum value of the number of accesses n is 1. In this case, the number of accesses is 1 or 2.

In step S120, the offset-calculating block 30 calculates the number of positions num1 at which data of a $1^{st}$ pixel of the rectangular region may be stored when the number of accesses is n according to Formula (15) corresponding to Formula (3).

$$num1 = n \times A\_pix - H\_pix + 1 = 1 \times 64 - 36 + 1 = 29 \quad (15)$$

It is possible to calculate a probability n1_rate for which the number of accesses is n according to Formula (16) corresponding to Formula (5).

$$n1\_rate = num1/A\_pix = 29/64 \quad (16)$$

Therefore, in step S120, the offset-calculating block 30 calculates the number of rows x necessary for the presence of a row having the minimum number of accesses according to Formula (17) corresponding to Formula (10).

$$x = 1/n1\_rate = 1/(29/64) = 2.20 \quad (17)$$

A value after the decimal point is rounded up, so that x is 3.

In step S130, the offset-calculating block 30 calculates an offset of each row according to Formula (18) corresponding to Formula (11).

$$\text{offset} = A\_pix/x = 64/3 = 21.33 \quad (18)$$

A value after the decimal point is rounded up, so that the offset is 22. In step S130, the offset-calculating block 30 calculates an offset offset_fin of the last row according to Formula (19) corresponding to Formula (12).

$$\text{offset\_fin} = A\_pix - (x-1) \times \text{offset} = 64 - (3-1) \times 22 = 20 \quad (19)$$

Figure 18:
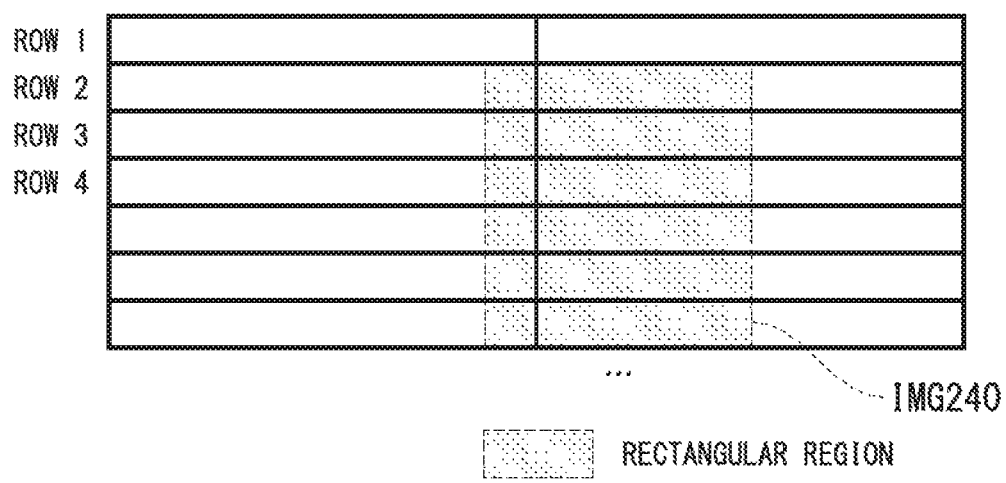
FIG. 18 is a reference diagram illustrating positions of image data in a memory in the conventional technology.

FIG. 18 illustrates positions of image data in a memory in the conventional technology. In FIG. 18, partial image data IMG240 is illustrated. Image data IMG240 is constituted of data of 36 rows, and data of each row is constituted of data of 36 pixels. In FIG. 18, only data of some rows of the image data IMG240 is illustrated. An access boundary is inside a region in which data of each row is stored with respect to all rows of the image data IMG240. Thus, when the image data IMG240 is transferred from the memory, data of all the rows of the image data IMG240 is read from the memory crossing the access boundary.

Figure 9:
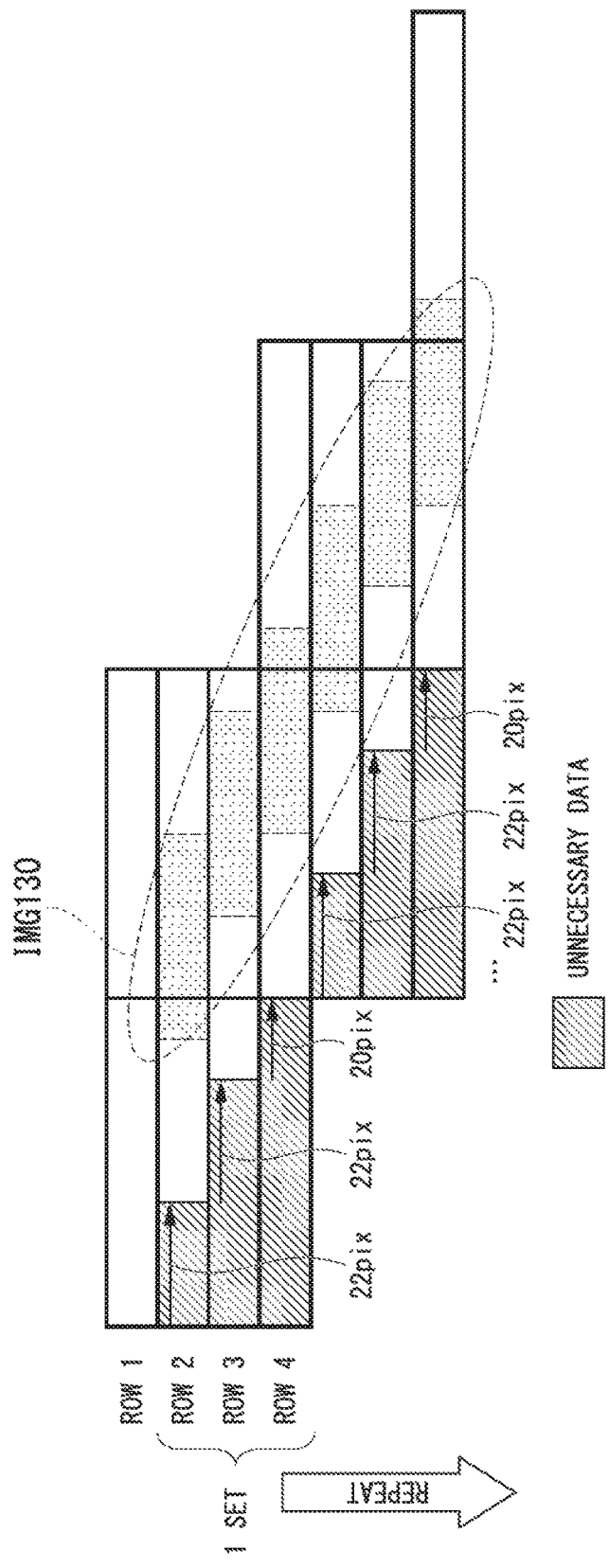
FIG. 9 is a reference diagram illustrating positions of image data in a memory in an embodiment of the present invention.

FIG. 9 illustrates positions of image data on the memory 7 in the embodiment of the present invention. Data of each row other than a $1^{st}$ row of the image data stored in the memory 7 is shifted by an offset from a position based on a position at which data of a previous row is stored. An offset of each row in FIG. 9 is 22 or 20.

In FIG. 9, partial image data IMG130 is illustrated. Image data IMG130 is constituted of data of 36 rows, and data of each row is constituted of data of 36 pixels. In FIG. 9, only data of some rows of the image data IMG130 is illustrated. An access boundary is inside a region in which data of each row is stored with respect to some rows of the image data IMG130. In FIG. 9, an access boundary is inside a region in which data of $1^{st}$ and $3^{rd}$ rows among $1^{st}$ to $3^{rd}$ rows of the image data IMG130 is stored. Thus, when the image data IMG130 is transferred from the memory 7, data of some rows of the image data IMG130 is read from the memory 7 crossing the access boundary.

When the image data IMG240 illustrated in FIG. 18 is transferred from the memory, two data transfers occur every row. Accordingly, 72 data transfers occur for the entire image data IMG240. On the other hand, when the image data IMG130 illustrated in FIG. 9 is transferred from the memory 7, two data transfers occur in two rows every three rows and one data transfer occurs in one row every three rows. That is, two data transfers occur in 24 rows of the image data IMG130 and one data transfer occurs in 12 rows of the image data IMG 130. Accordingly, 60 data transfers occur with respect to the entire image data IMG130. The number of transfers when the image data IMG130 is transferred is less than the number of transfers when the image data IMG240 is transferred. That is, in FIG. 9, a worst state in which the number of transfers of the partial image data is maximal is avoided.

In the fourth example, it is possible to control the number of transfers of data of a plurality of rows of partial image data. As described above, it is possible to reduce the number of transfers when the vertical size is greater than or equal to the number of rows x, that is, V_pix≥x.

(Method of Controlling Writing of Image Data to Memory 7)

An example of control by the write control block 20 of the preprocessing block 2 will be described. A size of the rectangular region is determined according to a shooting mode. The offset-calculating block 30 calculates an offset suitable for the rectangular region of the determined size. The offset-calculating block 30 notifies the write control block 20 of the offset. The write control block 20 determines a write address of image data based on the offset of the notification provided from the offset-calculating block 30. Hereinafter, an example in which the horizontal size of the rectangular region is three pixels and the vertical size of the rectangular region is four rows will be described.

Figure 10:
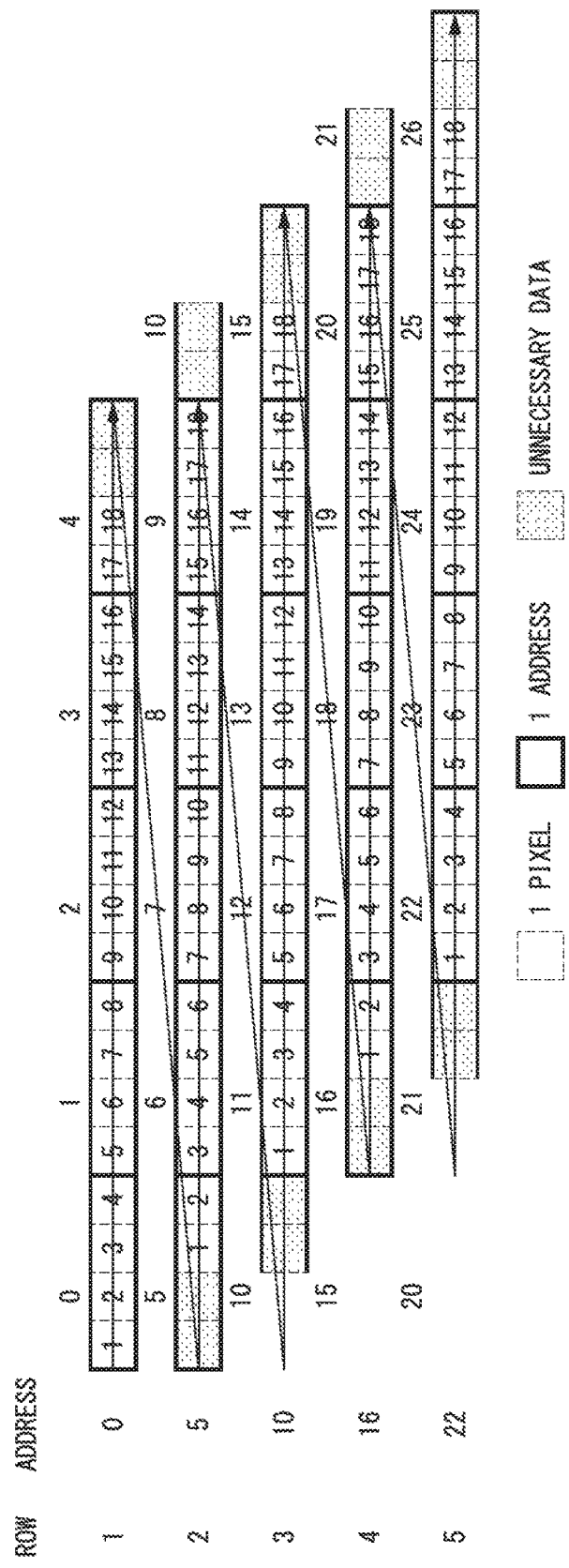
FIG. 10 is a reference diagram illustrating positions of image data in a memory in an embodiment of the present invention.
Figure 12:
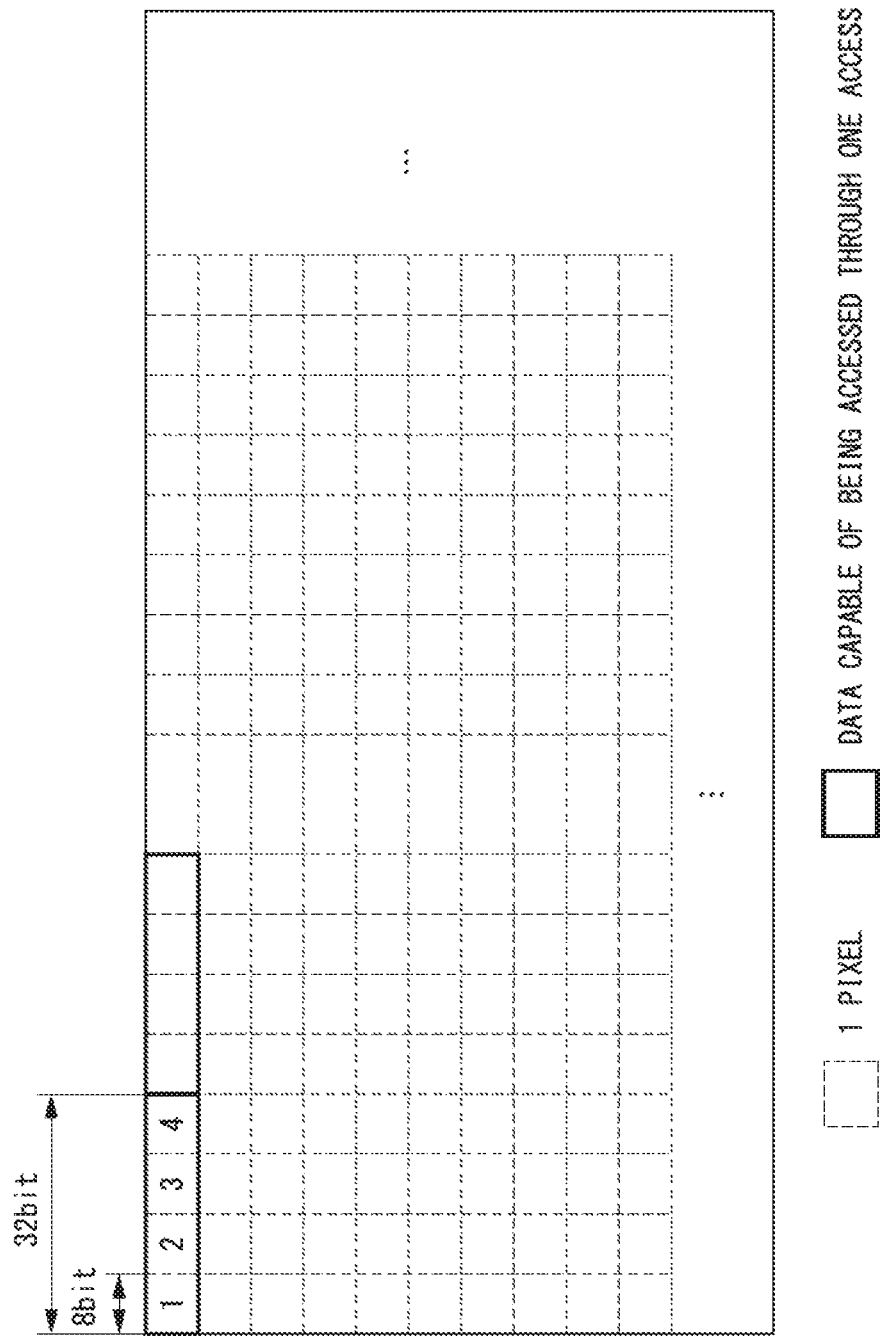
FIG. 12 is a reference diagram illustrating positions of image data in a memory in a conventional technology.
Figure 13:
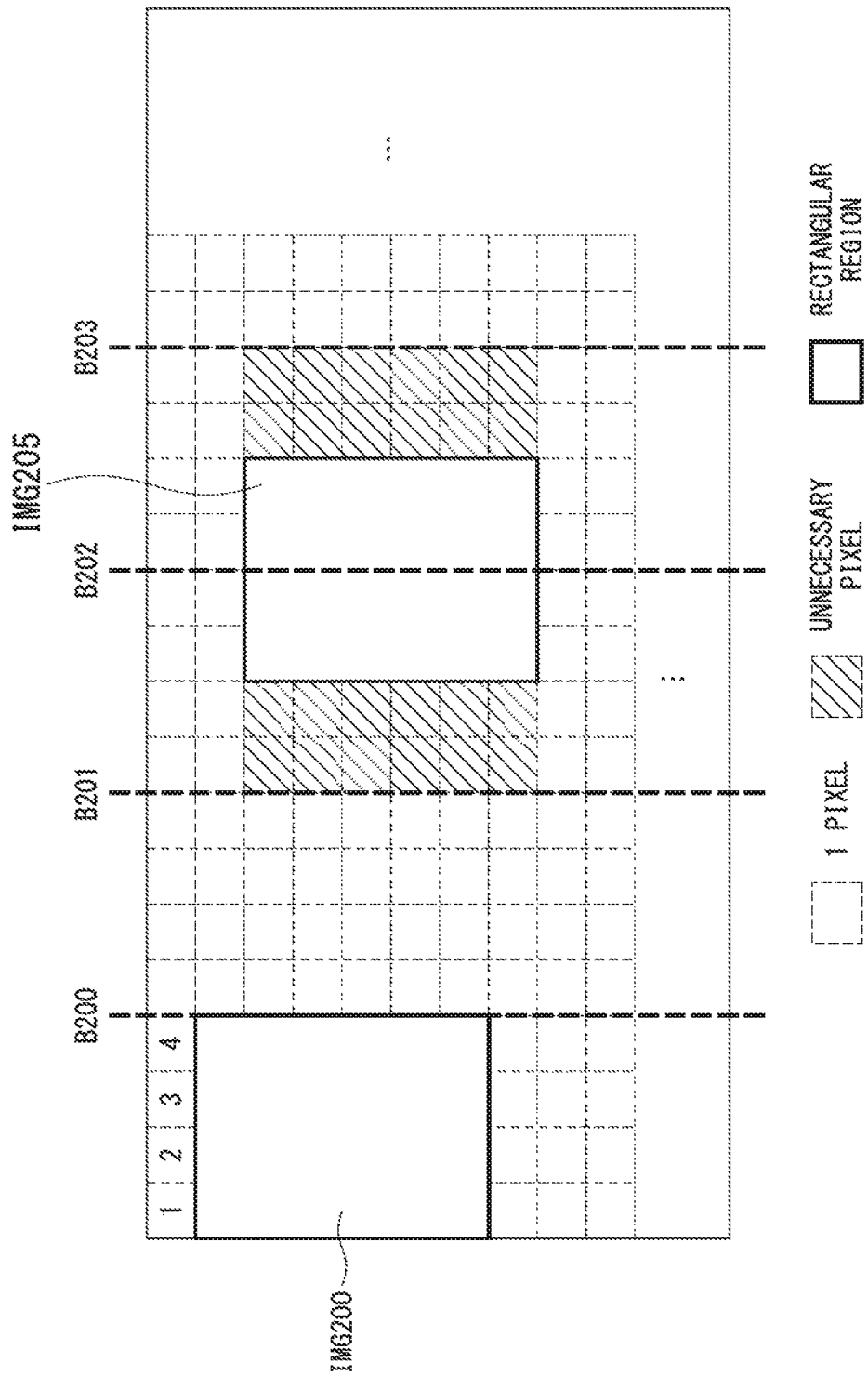
FIG. 13 is a reference diagram illustrating positions of image data in a memory in the conventional technology.

FIG. 10 illustrates positions of data of pixels on the memory 7 in the embodiment of the present invention. In FIG. 10, positions of image data constituted of data of five rows are illustrated. A leftmost number denotes a row number. A number written to the right of the row number denotes an address at which data of a $1^{st}$ pixel of each row is stored. Data of each row is constituted of data of 18 pixels. Numbers of 1 to 18 denote data of pixels of each row. Numbers of 0 to 26, which are written every four pixels, denote addresses. For each row, data of pixels is adjacent on an address space of the memory 7. A position at which data of each pixel of the image data is stored in FIG. 10 is the same as the position at which data of each pixel of the image data is stored in FIG. 2. Positions of access boundaries in FIG. 10 are the same as the positions of the access boundaries in FIG. 7.

As described above, a position at which data of a $1^{st}$ pixel of each row is stored is at the distance of an offset from a position next to a position at which necessary data subsequent to data of a last pixel of a previous row is stored. In FIG. 10, unnecessary data of two pixels is stored after data of a last pixel of each row. There is a region of the offset after a region in which the unnecessary data of the two pixels is stored. In FIG. 10, the offset of each row corresponds to two pixels. Unnecessary data is stored in the region of the offset.

The address is incremented by 1 sequentially from 0. When the row changes, the offset is added to a position at which data of a pixel is stored. The write control block 20 generates an address s_adr at which data of a $1^{st}$ pixel of each row of the image data is stored, and a position s_pix within the address.

Unnecessary data of two pixels after data of a last pixel of a $1^{st}$ row of the image data is stored. Data of a $1^{st}$ pixel of a $2^{nd}$ row of the image data is stored at a position shifted by an offset from a position at which unnecessary data of the $1^{st}$ row is stored. An address s_adr at which the data of the $1^{st}$ pixel of the $2^{nd}$ row of the image data is stored is 5. A position s_pix within the address at which the data of the $1^{st}$ pixel of the $2^{nd}$ row of the image data is stored is 2. Unnecessary data of two pixels after data of a last pixel of the $2^{nd}$ row of the image data is stored. Data of a $1^{st}$ pixel of a $3^{rd}$ row of the image data is stored at a position shifted by the offset from a position at which unnecessary data of the $2^{nd}$ row is stored. An address s_adr at which the data of the $1^{st}$ pixel of the $3^{rd}$ row of the image data is stored is 11. A position s_pix within the address at which the data of the $1^{st}$ pixel of the $3^{rd}$ row of the image data is stored is 0.

Unnecessary data of two pixels after data of a last pixel of the $3^{rd}$ row of the image data is stored. Data of a $1^{st}$ pixel of a $4^{th}$ row of the image data is stored at a position shifted by the offset from a position at which unnecessary data of the $3^{rd}$ row is stored. An address s_adr at which the data of the $1^{st}$ pixel of the $4^{th}$ row of the image data is stored is 16. A position s_pix within the address at which the data of the $1^{st}$ pixel of the $4^{th}$ row of the image data is stored is 3. Unnecessary data of two pixels after data of a last pixel of the $4^{th}$ row of the image data is stored. Data of a $1^{st}$ pixel of a $5^{th}$ row of the image data is stored at a position shifted by the offset from a position at which unnecessary data of the $4^{th}$ row is stored. An address s_adr at which the data of the $1^{st}$ pixel of the $5^{th}$ row of the image data is stored is 22. A position s_pix within the address at which the data of the $1^{st}$ pixel of the $5^{th}$ row of the image data is stored is 0.

Data of two last pixels of the $1^{st}$ row of the image data and unnecessary data of two pixels are written through one access to the memory 7. Likewise, data of two last pixels of the $3^{rd}$ row of the image data and unnecessary data of two pixels are written through one access to the memory 7. Likewise, data of two last pixels of the $5^{th}$ row of the image data and unnecessary data of two pixels are written through one access to the memory 7.

Unnecessary data of two pixels stored after data of two last pixels of the $2^{nd}$ row of the image data and unnecessary data of two pixels stored in a region of the offset of the $3^{rd}$ row are written through one access to the memory 7. Likewise, unnecessary data of two pixels stored after data of two last pixels of the $4^{th}$ row of the image data and unnecessary data of two pixels stored in a region of the offset of the $5^{th}$ row are written through one access to the memory 7.

The write control block 20 sets an address and data in the write block 21. The write block 21 writes data at the set address of the memory 7.

(Method of Controlling Reading of Image Data from Memory 7)

An example of control by the read control block 31 of the image-processing block 3 will be described. The offset-calculating block 30 notifies the read control block 31 of an offset. The offset-calculating block 30 notifies the read control block 31 of address information of a $1^{st}$ pixel of a rectangular region (an upper-left corner of the rectangular region). The address information includes an address Adr0 and a position s0_pix within the address. The read control block 31 determines a read address of partial image data based on the offset of the notification provided from the offset-calculating block 30 and the address information of the notification provided from the offset-calculating block 30. Hereinafter, an example in which the horizontal size of the rectangular region is three pixels and the vertical size of the rectangular region is four rows will be described.

Figure 19:
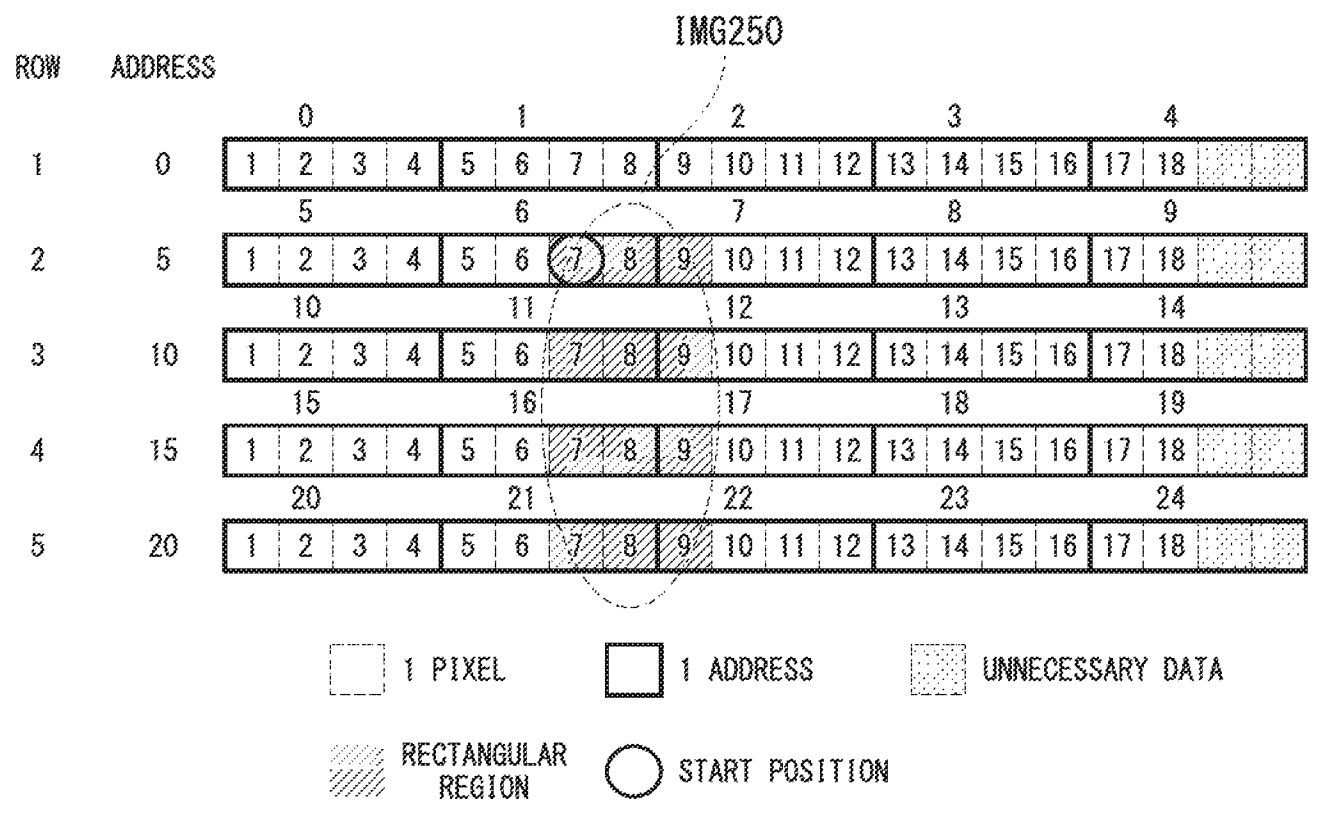

FIG. 19 illustrates positions of data of pixels on a memory in the conventional technology. In FIG. 19, positions of image data constituted of data of five rows are illustrated. A leftmost number denotes a row number. A number written to the right of the row number denotes an address at which data of a $1^{st}$ pixel of each row is stored. Data of each row is constituted of data of 18 pixels. Numbers of 1 to 18 denote data of pixels of each row. Numbers of 0 to 24, which written every four pixels, denote addresses. In each row, data of pixels is adjacent on an address space of the memory. A position at which data of each pixel of the image data is stored in FIG. 19 is the same as the position at which data of each pixel of the image data is stored in FIG. 15. Positions of access boundaries in FIG. 19 are the same as the positions of the access boundaries in FIG. 15.

In FIG. 19, partial image data IMG250 is illustrated. Image data IMG250 is constituted of data of four rows, and data of each row is constituted of data of three pixels. Data of each row of the image data IMG250 is constituted of data of $7^{th}$ to $9^{th}$ pixels in data of $2^{nd}$ to $5^{th}$ rows of image data of 18 pixels×5 rows.

Data of a $1^{st}$ row of the image data IMG250 is stored at addresses 6 and 7. Data of a $2^{nd}$ row of the image data IMG250 is stored at addresses 11 and 12. Data of a $3^{rd}$ row of the image data IMG250 is stored at addresses 16 and 17. Data of a $4^{th}$ row of the image data IMG250 is stored at addresses 21 and 22.

Figure 11:
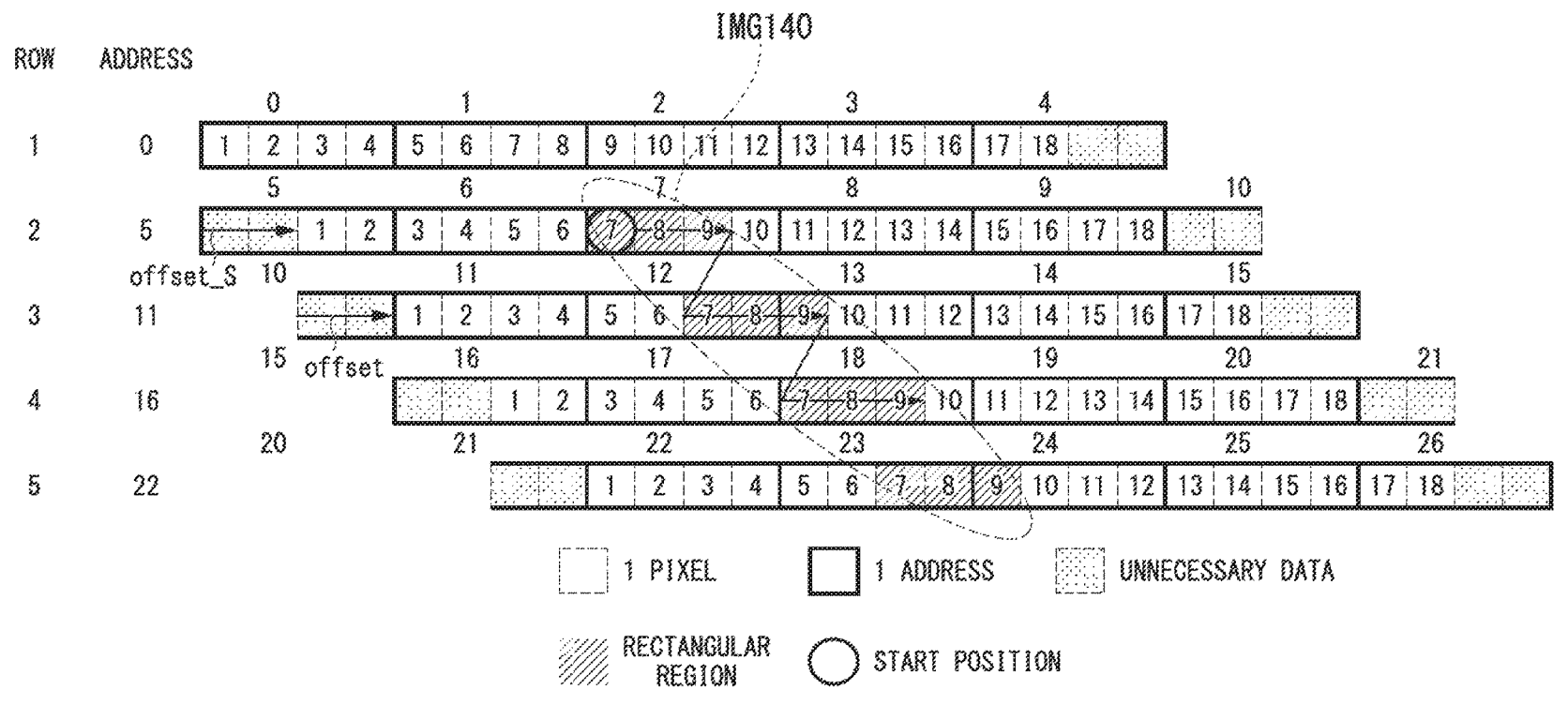

FIG. 11 illustrates positions of data of pixels on the memory 7 in the embodiment of the present invention. In FIG. 11, positions of image data constituted of data of five rows are illustrated. A leftmost number denotes a row number. A number written to the right of the row number denotes an address at which data of a $1^{st}$ pixel of each row is stored. Data of each row is constituted of data of 18 pixels. Numbers of 1 to 18 denote data of pixels of each row. Numbers of 0 to 26, which are written every four pixels, denote addresses. For each row, data of pixels is adjacent on an address space of the memory 7. A position at which data of each pixel of the image data is stored in FIG. 11 is the same as the position at which data of each pixel of the image data is stored in FIG. 10. A position of an access boundary in FIG. 11 is the same as the position of an access boundary in FIG. 10.

As described above, a position at which data of a $1^{st}$ pixel of each row is stored is at the distance of an offset from a position next to a position at which unnecessary data subsequent to data of a last pixel of the previous row is stored. In FIG. 11, unnecessary data of two pixels is stored after data of a last pixel of each row. There is a region of the offset after a region in which the unnecessary data of the two pixels is stored. In FIG. 11, the offset of each row corresponds to two pixels. Unnecessary data is stored in the region of the offset.

In FIG. 11, partial image data IMG140 is illustrated. Image data IMG140 is constituted of data of four rows, and data of each row is constituted of data of three pixels. Data of each row of the image data IMG140 is constituted of data of $7^{th}$ to $9^{th}$ pixels in data of $2^{nd}$ to $5^{th}$ rows of image data of 18 pixels×5 rows.

Data of a $1^{st}$ row of the image data IMG140 is stored at address 7. Data of a $2^{nd}$ row of the image data IMG140 is stored at addresses 12 and 13. Data of a $3^{rd}$ row of the image data IMG140 is stored at address 18. Data of a $4^{th}$ row of the image data IMG140 is stored at addresses 23 and 24.

In FIGS. 19 and 11, a position (a start position) of a $1^{st}$ pixel of the rectangular region is illustrated. The start position in the image data IMG250 is a $3^{rd}$ position of address 6. The start position in the image data IMG140 is a $1^{st}$ position of address 7. A start position provided to notify the read control block 31 by the offset-calculating block 30 is the same as a conventional start position. Thus, the read control block 31 converts the start position of the notification provided from the offset-calculating block 30 into a start position corresponding to FIG. 11.

Address Adr0 of the notification provided from the offset-calculating block 30 is 6 and a position s0_pix within the address of the notification provided from the offset-calculating block 30 is 2. The read control block 31 calculates a row line0 which is a start position according to Formula (20) based on an address Fh_max_adr corresponding to a horizontal size of the image data. Because data of one row of the image data is stored in a memory region of address 5, the address Fh_max_adr is 5. A value after the decimal point of a calculation result of Formula (20) is rounded up.

$$\text{line0}=\text{Adr0}/Fh\_\text{max}\_\text{adr}+1 \qquad (20)$$

In this example, line0 is 2 because Adr0 is 6 and Fh_max_adr is 5. Based on a row line0, which is the start position, the read control block 31 calculates a sum offset_S of offsets up to the row according to Formula (21).

$$\text{offset}\_S=\text{offset}\times(\text{line0}-1)=2\times(2-1)=2 \qquad (21)$$

Depending upon the presence of an offset, the start position is shifted to a conventional start position. The read control block 31 calculates a shift amount of add_adr in units of addresses according to Formula (22). In Formula (22), A_pix is the number of pixels per access. A value after the decimal point of a calculation result of Formula (22) is rounded down.

$$\text{add}\_\text{adr}=\text{offset}\_S/A\_\text{pix} \qquad (22)$$

In this example, add_adr is 0 because offset_S is 2 and A_pix is 4. That is, there is no shift in units of addresses based on the offset. The read control block 31 calculates a shift amount offset_a within the address according to Formula (23).

$$\text{offset}\_a=(\text{offset}\_S/A\_\text{pix}-\text{add}\_\text{adr})\times A\_\text{pix}=\text{offset}\_S-\text{add}\_\text{adr}\times A\_\text{pix} \qquad (23)$$

In this example, offset_a is 2 because offset_S is 2, add_adr is 0, and A_pix is 4. That is, a position within the address is shifted by 2 according to the offset. The read control block 31 calculates a position s_pix within the address of the start position according to Formula (24) based on a position s0_pix within the address of notification provided from the offset-calculating block 30 and a shift amount offset_a within the address.

$$s\_\text{pix}=s0\_\text{pix}+\text{offset}\_a \qquad (24)$$

Because s0_pix is 2 and offset_a is 2, s_pix is 4. That is, a position within the address exceeds an address boundary. Accordingly, an address adr of the start position is 7 and a position s_pix within the address of the start position is 0.

That is, the start position is a $1^{st}$ position of address 7. The calculated address adr and the position s_pix within the address are held as a start position of a row of the rectangular region. The start position of the row includes the address adr_1 and the position s_pix within the address. The address adr is held as the address adr_1. The position s_pix within the address is held as a position s_pix_1 within the address. As described above, the read control block 31 converts a start position of the rectangular region when no offset is set into a start position of the rectangular region when the offset is set.

When the row changes, the read control block 31 shifts the start position of the row by an amount based on the address Fh_max_adr corresponding to the horizontal size of the image data and an offset. Specifically, the read control block 31 calculates the address adr by adding the address Fh_max_adr to the address adr_1. Also, the read control block 31 calculates the position s_pix within the address by adding the offset to the position s_pix_1 within the address.

In this example, the address adr is 12 because the address adr_1 is 7 and the address Fh_max_adr is 5. In addition, in this example, the position s_pix within the address is 2 because the position s_pix_1 within the address is 0 and the offset is 2. That is, the start position of a $2^{nd}$ row of the rectangular region is a $3^{rd}$ position of address 12. The address adr is held as the address adr_1. The position s_pix within the address is held as the position s_pix_1 within the address.

Start positions of $3^{rd}$ and $4^{th}$ rows of the rectangular region are calculated by a similar method as described above. The read control block 31 generates a read address of data of each pixel by incrementing a position within the address by 1 from the start position of each row. When the position within the address crosses an access boundary, that is, an address boundary, the read control block 31 increments the address adr by 1 and resets the position s_pix within the address to 0.

The read control block 31 sets the address in the read block 32. The read block 32 reads data from the set address of the memory 7.

The write control block 33 of the image-processing block 3 can generate an address for writing partial image data according to a similar method as described above.

The image-processing apparatus (image-processing unit 110) of the embodiment of the present invention includes the memory 7, the offset-calculating block 30, the write block 21, the write control block 20, the read block 32, the read control block 31, and the image-processing block 3.

In the embodiment of the present invention, a write address of image data and a read address of partial image data are generated based on the offset. Thereby, transfer data is read from the memory 7 without crossing the access boundary in at least one row when transfer data is read from the memory 7 for each row. Thus, it is possible to avoid a worst state in which the number of transfers of the partial image data is maximal.

In the embodiment of the present invention, the offset may be calculated based on an amount of data capable of being accessed through one access to the memory 7, an amount of data of one pixel, and a horizontal size of a rectangular region. In this case, it is possible to control the number of transfers of data of a plurality of rows of the partial image data. Thus, it is possible to reduce the number of transfers regardless of a vertical size of the rectangular region.

In the embodiment of the present invention offset of each row may be a fixed value. In this case, it is possible to easily calculate the offset.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. An image-processing apparatus, comprising:
a memory in which first image data is recorded, wherein the first image data includes second image data of a rectangular region;
an offset-calculating block configured to calculate an offset for reading transfer data from the memory without crossing an access boundary in at least one row when the transfer data to be transferred through a burst transfer among the second image data is read from the memory for each row, wherein an amount of position gap between a storage area of data of a first row of the first image data and a storage area of data of a second row adjacent to the first row includes the offset in the memory and wherein the access boundary is a boundary of data capable of being accessed through one access to the memory;
a write block configured to write the first image data to the memory through a bus;
a write control block configured to generate a write address of the first image data based on the offset calculated by the offset-calculating block and control the write block based on the generated write address;
a read block configured to read the second image data from the memory through the bus;
a read control block configured to generate a read address of the second image data based on the offset calculated by the offset-calculating block and control the read block based on the generated read address; and
an image-processing block configured to perform image processing on the second image data read by the read block,
wherein the offset-calculating block calculates the offset based on an amount of data capable of being accessed through one access to the memory, an amount of data of one pixel, and a horizontal size of the rectangular region,
wherein the offset-calculating block calculates the number of pixels per access by dividing the amount of data capable of being accessed through the one access to the memory by the amount of data of the one pixel,
wherein the offset-calculating block calculates the minimum number of accesses necessary to transfer data of the horizontal size by dividing the horizontal size of the rectangular region by the number of pixels per access,
wherein the offset-calculating block
calculates a third value by adding 1 to a second value obtained by subtracting the horizontal size of the rectangular region from a first value obtained by multiplying the minimum number of accesses by the number of pixels per access, and
calculates a fourth value by dividing the number of pixels per access by the third value, wherein the fourth value is the number of rows necessary to generate a row in which the transfer data does not cross a boundary of the address when the transfer data is read from the memory, and wherein the offset-calculating block calculates the offset of each row by dividing the number of pixels per access by the fourth value.

2. The image-processing apparatus according to claim 1, wherein the offset is less than an amount of data capable of being transferred through one transfer.

3. The image-processing apparatus according to claim 1, wherein the offset of each row is a fixed value.

* * * * *